United States Patent
Thomas et al.

(10) Patent No.: US 10,742,553 B1
(45) Date of Patent: Aug. 11, 2020

(54) FORWARDING INFORMATION BASE CACHING

(71) Applicant: Juniper Networks, Inc., Sunnyvale, CA (US)

(72) Inventors: Reji Thomas, Bangalore (IN); Jimmy Jose, Hosur (IN); Amit Arora, Bangalore (IN); Sairam Neelam, Hyderabad (IN)

(73) Assignee: Juniper Networks, Inc., Sunnyvale, CA (US)

(*) Notice: Subject to any disclaimer, the term of this patent is extended or adjusted under 35 U.S.C. 154(b) by 154 days.

(21) Appl. No.: 15/991,694

(22) Filed: May 29, 2018

(51) Int. Cl.
| H04L 12/28 | (2006.01) |
| H04L 12/747 | (2013.01) |
| H04L 29/06 | (2006.01) |
| H04L 12/741 | (2013.01) |
| H04L 29/08 | (2006.01) |

(52) U.S. Cl.
CPC ............ *H04L 45/742* (2013.01); *H04L 45/54* (2013.01); *H04L 45/745* (2013.01); *H04L 65/1066* (2013.01); *H04L 67/2842* (2013.01)

(58) Field of Classification Search
CPC ......... H04L 45/02; H04L 45/64; H04L 47/18; H04L 61/2007; H04L 41/082; H04L 41/0893; H04L 41/0896; H04L 41/147; H04L 41/044; H04L 41/20; H04L 41/32; H04L 41/5051
See application file for complete search history.

(56) References Cited

U.S. PATENT DOCUMENTS

| 6,262,976 | B1 | 7/2001 | McNamara | |
| 8,504,718 | B2* | 8/2013 | Wang | H04L 45/306 709/238 |
| 8,638,791 | B2* | 1/2014 | Pacella | H04L 45/00 370/392 |
| 8,762,477 | B2* | 6/2014 | Xie | H04L 67/327 709/213 |
| 8,917,729 | B1* | 12/2014 | Kumar | H04L 45/22 370/395.31 |
| 2004/0146044 | A1* | 7/2004 | Herkerdorf | H04L 45/00 370/351 |
| 2015/0117459 | A1* | 4/2015 | Liu | H04L 45/742 370/392 |
| 2017/0359305 | A1* | 12/2017 | Yin | H04L 45/28 |
| 2018/0181604 | A1* | 6/2018 | Marohn | G06F 16/273 |

FOREIGN PATENT DOCUMENTS

CN 101005458 B 8/2012

* cited by examiner

*Primary Examiner* — Phuc H Tran
(74) *Attorney, Agent, or Firm* — Harrity & Harrity, LLP

(57) ABSTRACT

A network device may determine a control plane session type associated with a control plane session. The control plane session may be associated with the network device. The network device may determine whether the control plane session type is associated with a forwarding information base (FIB) cache on the network device. The network device may obtain, based on determining that the control plane session type is associated with the FIB cache, forwarding information associated with the control plane session. The forwarding information may be stored in a FIB, associated with the FIB cache, on the network device. The network device may store the forwarding information in the FIB cache and process the control plane session using the forwarding information stored in the FIB cache.

20 Claims, 14 Drawing Sheets

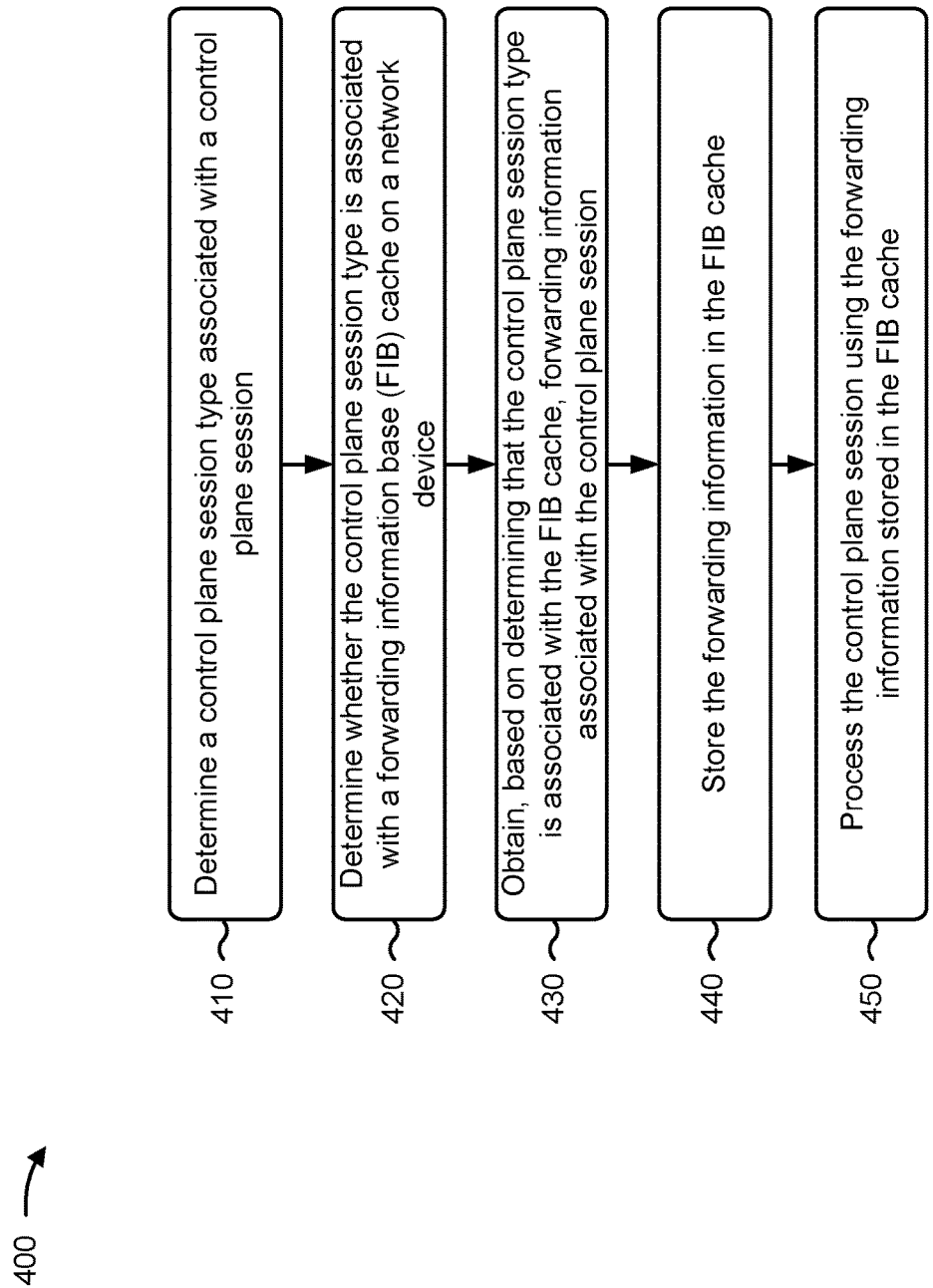

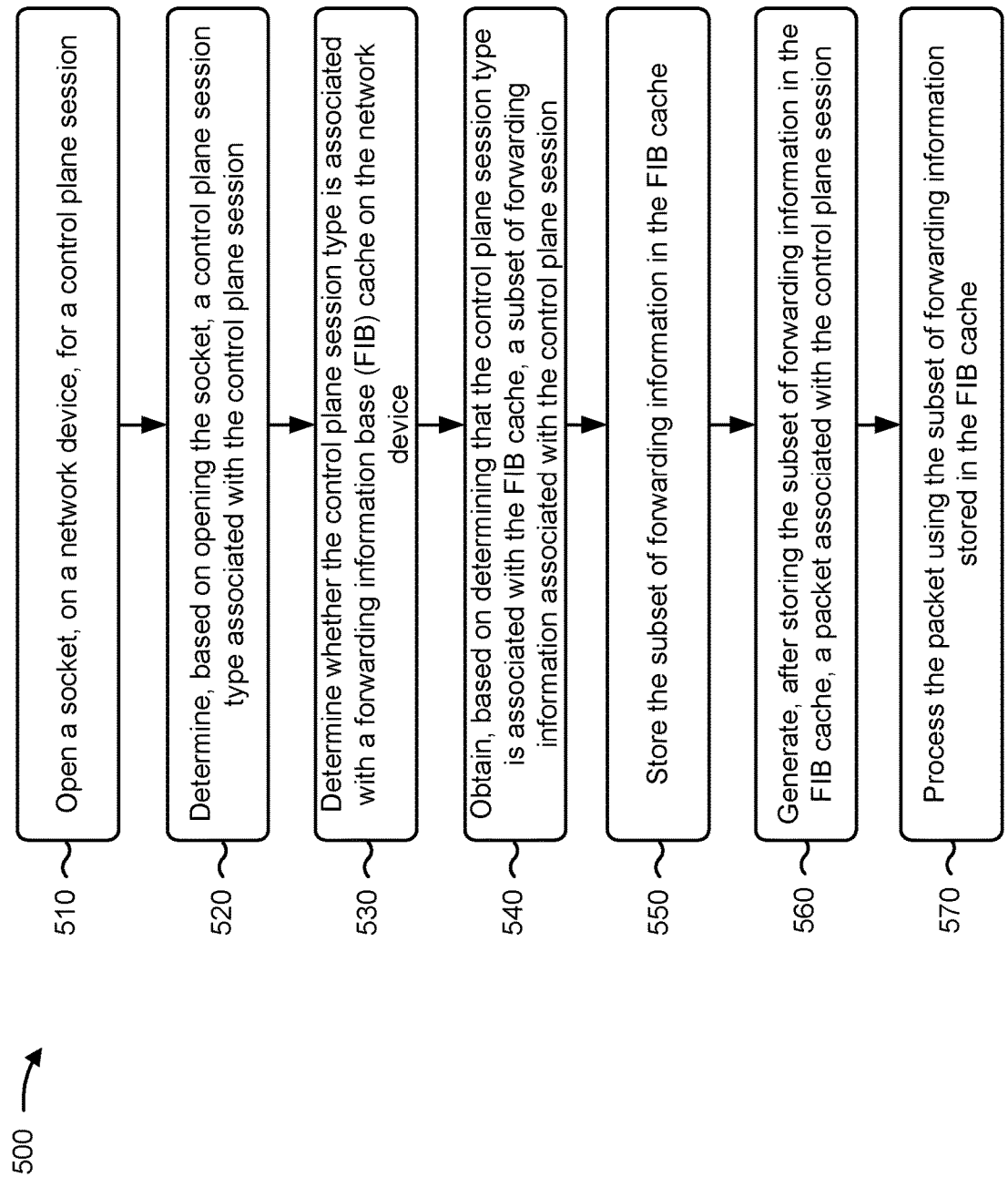

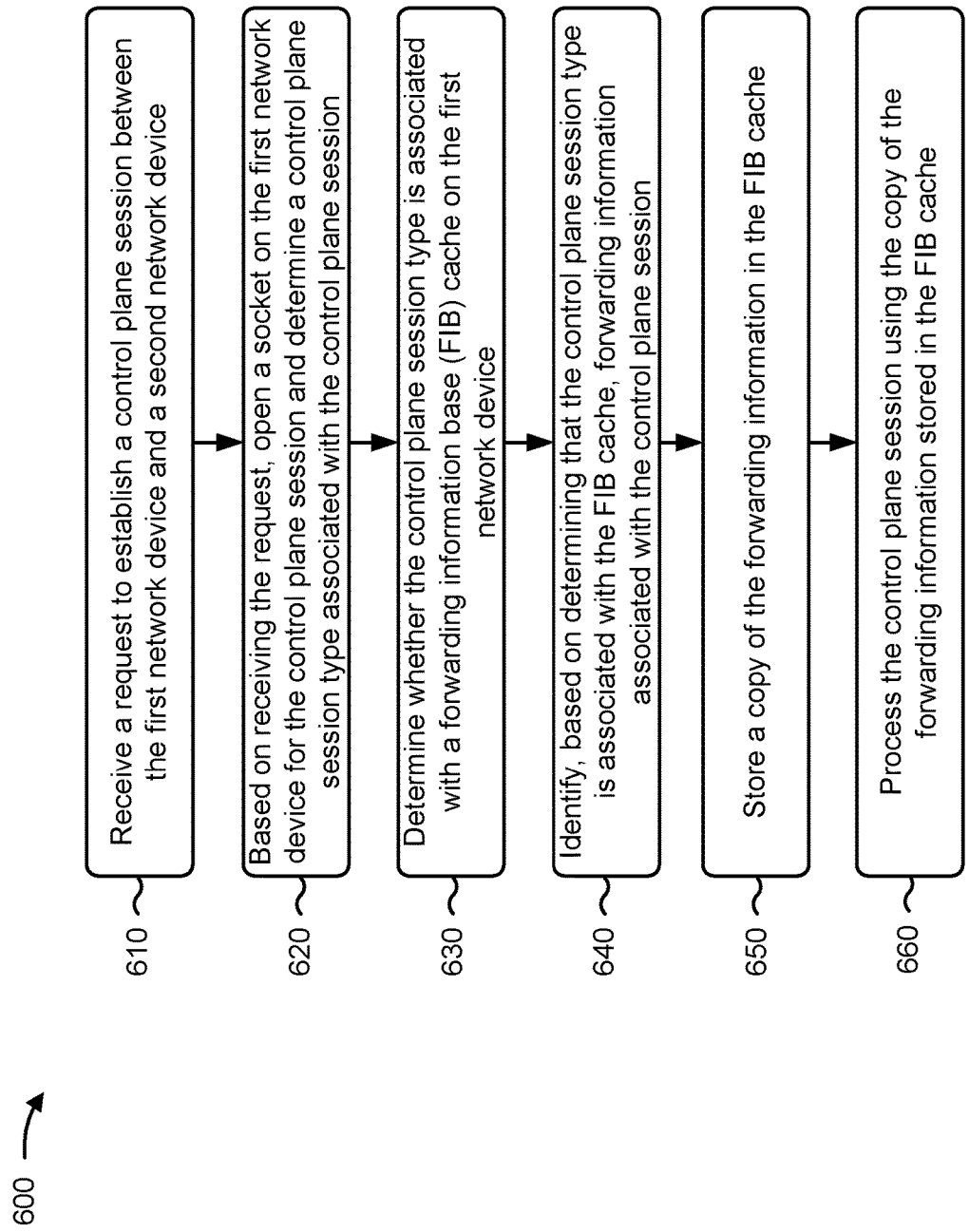

FORWARDING INFORMATION BASE CACHING

BACKGROUND

A forwarding information base (FIB) may be a data structure that includes forwarding information, such as information identifying a destination, information identifying a next hop in a route to the destination, and/or the like. A network device may perform a lookup in the FIB to identify forwarding information, and use the forwarding information to forward a packet to a destination.

SUMMARY

According to some implementations, a device may include one or more memories, and one or more processors to determine a control plane session type associated with a control plane session. The control plane session may be associated with the network device. The one or more processors may determine whether the control plane session type is associated with a FIB cache on the network device. The one or more processors may obtain, based on determining that the control plane session type is associated with the FIB cache, forwarding information associated with the control plane session. The forwarding information may be stored in a FIB, associated with the FIB cache, on the network device. The one or more processors may store the forwarding information in the FIB cache and process the control plane session using the forwarding information stored in the FIB cache.

According to some implementations, a non-transitory computer-readable medium may store instructions that include one or more instructions that, when executed by one or more processors, cause the one or more processors to open a socket, on a network device, for a control plane session. The one or more instructions may cause the one or more processors to determine, based on opening the socket, a control plane session type associated with the control plane session. The one or more instructions may cause the one or more processors to determine whether the control plane session type is associated with a FIB cache on the network device. The one or more instructions may cause the one or more processors to obtain, based on determining that the control plane session type is associated with the FIB cache, a subset of forwarding information associated with the control plane session. The subset of forwarding information may be stored in a FIB, associated with the FIB cache, on the network device. The one or more instructions may cause the one or more processors to store the subset of forwarding information in the FIB cache, generate, after storing the subset of forwarding information in the FIB cache, a packet associated with the control plane session, and process the packet using the subset of forwarding information stored in the FIB cache.

According to some implementations, a method may include receiving, at a first network device, a request to establish a control plane session between the first network device and a second network device. The method may include, based on receiving the request, opening, by the first network device, a socket on the first network device for the control plane session, and determining, by the first network device, a control plane session type associated with the control plane session. The method may include determining, by the first network device, whether the control plane session type is associated with a FIB cache on the first network device. The method may include identifying, by the first network device and based on determining that the control plane session type is associated with the FIB cache, forwarding information associated with the control plane session. The forwarding information may be stored in a FIB, on the first network device, associated with the FIB cache. The method may include processing, by the first network device, the control plane session using the copy of the forwarding information stored in the FIB cache.

BRIEF DESCRIPTION OF THE DRAWINGS

FIG. 4 is a flow chart of an example process for FIB caching.

FIG. 5 is a flow chart of an example process for FIB caching.

FIG. 6 is a flow chart of an example process for FIB caching.

DETAILED DESCRIPTION

Figure 1A:
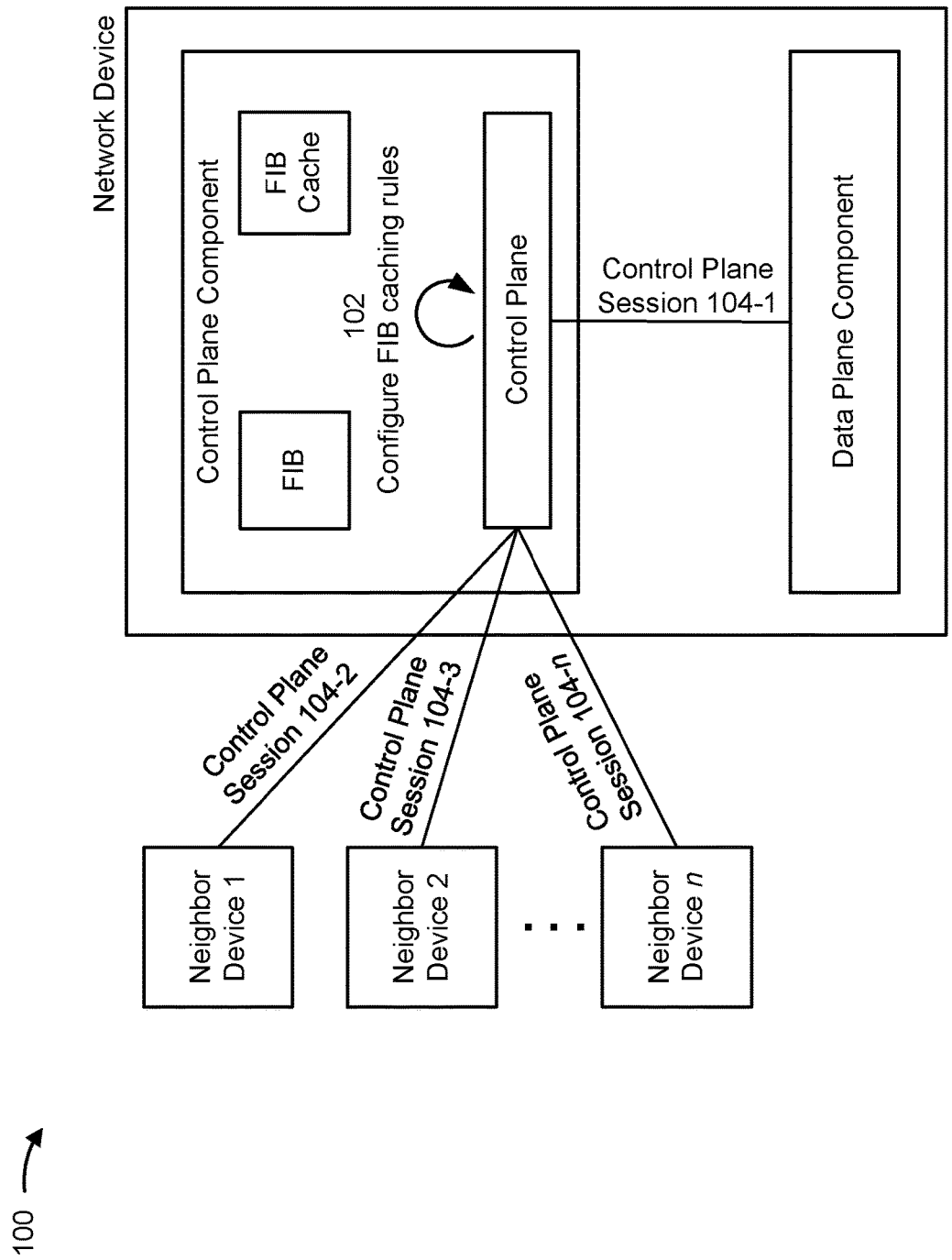
FIGS. 1A-1I are diagrams of an example implementation described herein.

The following detailed description of example implementations refers to the accompanying drawings. The same reference numbers in different drawings may identify the same or similar elements.

A FIB on a network device may store forwarding information associated with a large quantity (e.g., on the order of millions) of destinations. In some cases, a majority of the destinations may be used for data plane traffic while a relatively small subset (e.g., in the thousands in some cases) of the destinations may be used for control plane traffic. Control plane traffic may be used to exchange network topology information between network devices, to exchange messages between network devices, to detect faults between network devices, to build a routing information base (RIB) and/or a FIB, and/or the like.

In some situations, a network event, such as a link in the network going offline, an attempt to repair the link, any rerouting in the network that occurs due to the link going offline, and/or the like, may cause delays in FIB lookups due to the need to identify alternative routes, update routes in the FIB, and/or the like. As a result, control plane traffic may be delayed, even if the network event occurred on a link unassociated with the control plane traffic. If the control plane traffic is delayed, the network event may cause other network events and/or events within the network device to occur. For example, if the network event causes bidirectional forwarding detection (BFD) protocol packets being exchanged between the network device and a neighbor device to be delayed, the network device may determine that the neighbor device has failed (and/or vice-versa), which may cause other devices in the network to seek alternative routes around the network device and/or the neighbor device. As another example, if the network event causes packets being exchanged between a control plane and a data plane within the network device to be delayed, the control plane may determine that the data plane has failed (and/or vice-versa), which may cause the network device to fail over to a backup control plane and/or a backup data plane, or the network device may be taken offline altogether.

Some implementations described herein provide a network device that is capable of protecting control plane traffic from a network event by processing various types of control plane traffic using a FIB cache that is associated with a FIB of the network device. The FIB cache may have a lookup queue that is separate from a lookup queue of the FIB, which prevents delays in FIB lookup times from impacting lookup times of the FIB cache.

In some implementations, the network device may determine a control plane session type associated with a control plane session that is associated with the network device. The network device may determine whether the control plane session type is associated with the FIB cache on the network device. The network device may obtain, based on determining that the control plane session type is associated with the FIB cache, forwarding information associated with the control plane session, and may store the forwarding information in the FIB cache. The network device may process the control plane session using the forwarding information stored in the FIB cache.

In this way, if the network event occurs, the network device may be able to process the control plane traffic in a way that prevents the control plane traffic from being delayed and/or dropped altogether. This conserves memory, processing, and networking resources that would have otherwise been consumed on repairing additional network events and/or negative effects that would have occurred if the control plane traffic were to be delayed and/or dropped. Moreover, this maintains network uptime and availability, as well as improves network reliability.

FIGS. 1A-1I are diagrams of an example implementation 100 described herein. As shown in FIGS. 1A-1I, example implementation 100 may include a network device and one or more neighbor devices (e.g., neighbor device 1 through neighbor device n, collectively referred to as "neighbor devices", and individually referred to as "neighbor device").

The network device and/or the neighbor devices may include various types of network devices, such a router, a gateway, a switch, a bridge, a wireless access point, a base station, and/or the like. The neighbor devices and the network device may be included in a network, such as a cellular network, a local area network (LAN), a core network, an access network, a wide area network (WAN) such as the Internet, a cloud network, and/or the like. In some implementations, a neighbor device may be communicatively connected with the network device through another neighbor device. In some implementations, a neighbor device may be communicatively connected directly with the network device (i.e., where there is no other neighbor device in the communications path between the neighbor device and the network device).

The network device may include various components, such as a data plane component, a control plane component, and/or the like. The data plane component may receive, process, and/or transmit data plane packets. A data plane packet may be a packet that travels through the network device, and is not originated or terminated at the network device. The data plane component may receive a data plane packet, perform a lookup in a FIB on the network device to identify forwarding information associated with the data plane packet (e.g., information identifying a destination of the data packet, information identifying a next hop in a route to the destination, and/or the like), and transmit the data plane packet to the next hop based on the forwarding information.

The control plane component may receive, process, and/or transmit control plane packets. A control plane packet may be a packet that is originated in the control plane of the network device (i.e., generated by the network device) or terminated in the control plane of the network device (i.e., the network device is the destination of the packet). In some implementations, a control plane packet may be generated at a neighbor device, and the network device may forward the control plane packet to another neighbor device. The control plane component may include a control plane, a FIB, a FIB cache associated with the FIB, and/or other elements.

The control plane may perform various functions, such as populating the FIB with forwarding information, maintaining the forwarding information stored in the FIB (e.g., updating the forwarding information stored in the FIB, removing forwarding information from the FIB, and/or the like), establishing and/or terminating a control plane session between the control plane and another component in the network device and/or between the control plane and a device external to the network device, managing the data plane component, populating and maintaining the FIB cache for a control plane session, and/or the like.

The FIB may be a data structure that stores forwarding information associated with one or more destinations in the network, in another network, and/or the like. The forwarding information associated with a destination may include information identifying an address of the destination (e.g., an Internet protocol (IP) address, a port address, and/or the like), information identifying a next hop in a route to the destination, information identifying an interface associated with the destination (e.g., a media access control (MAC) identifier), and/or the like.

The control plane may populate and maintain the forwarding information in the FIB based on various techniques. For example, the control plane may learn routes in the network and/or updates to the routes in the network based on one or more routing protocols, such as a routing information protocol (RIP), an open shortest path first (OSPF) protocol, a border gateway protocol (BGP), an interior gateway routing protocol (IGRP), an enhanced IGRP (EIGRP), a distance-vector routing protocol, an intermediate system to intermediate system (IS-IS) protocol, and/or the like, and may store information identifying the routes and/or the updates to the routes, as forwarding information, in the FIB. In some implementations, the FIB may be populated with static forwarding information, which may be forwarding information configured and/or maintained by a user such as a network administrator.

The control plane may establish and/or terminate a control plane session between the control plane and the data plane component, between the control plane and a neighbor device, and/or the like. A control plane session may be a connection between the control plane and the data plane component or a neighbor device on which control plane packets are transmitted.

To establish a control plane session (e.g., between the control plane and neighbor device 1), the control plane may open a socket on the network device for the control plane session. The socket may be an endpoint of the control plane session on the network device, and may be associated with an address (e.g., an IP address, a port address, and/or the like) on the network device. In some implementations, the control plane may establish the control plane session based on receiving a request from neighbor device 1 to establish the control plane session. In some implementations, the control plane may establish the control plane session without receiving a request from neighbor device 1 (i.e., the control plane may initiate the control plane session).

To terminate the control plane session, the control plane may close the socket for the control plane session. The control plane may terminate the control plane session between the control plane and neighbor device 1, for example, based on determining that the control plane session is idle (e.g., a quantity of control plane packets transmitted in a period of time in the control plane session does not satisfy a threshold quantity of control plane packets), based on receiving a request from neighbor device 1 to terminate the control plane session, based on determining that the control plane session is no longer needed (e.g., the control plane has transmitted and/or received all control plane packets intended for the control plane session), and/or the like.

The control plane may manage the data plane component by providing forwarding information in the FIB to the data plane component (e.g., to transmit data plane packets), monitoring the status of the data plane component, and/or the like. In some implementations, the control plane and the data plane component may be communicatively connected via an internal connection (i.e., a connection internal to the network device, such as an internal Ethernet interface and/or the like). The control plane may provide the forwarding information to the data plane component on the internal connection in a control plane session between the control plane and the data plane component.

The control plane may monitor the status of the data plane component using the control plane session between the control plane and the data plane component. For example, the control plane and the data plane component may exchange one or more keepalive packets based on a threshold time interval, based on a threshold quantity of keepalive packets in a particular time interval, and/or the like. The control plane may determine that the data plane component has failed if the control plane does not receive a keepalive packet from the data plane component in a time interval that satisfies the threshold time interval, if the control plane does not receive a quantity of keepalive packets in a particular time interval that satisfies the threshold quantity of keepalive packets, and/or the like. In some implementations, the control plane may perform various actions based on determining that the data plane component has failed, such as switching the network device over to a backup data plane component, providing an instruction to the network device to reset the network device, automatically resetting the network device, providing an instruction to the data plane component to reset the data plane component, automatically resetting the data plane component, generating and providing an alarm (i.e., a notification that an event has occurred in the network device), and/or the like.

The FIB cache may be a data structure separate from the FIB and/or may be included in a same data structure. The FIB cache may have a lookup queue that is separate from a lookup queue of the FIB, which prevents delays in FIB lookup times from impacting lookup times of the FIB cache. The control plane may use the FIB cache to store forwarding information for a subset of the destinations associated with the FIB. For example, the control plane may use the FIB cache to store forwarding information associated with a control plane session (i.e., forwarding information associated with a destination of the control plane session). In this way, the control plane may use the FIB cache to protect the control plane session from a network event (e.g., a connection in the network going offline, an attempt to repair the connection, any connection rerouting that occurs due to the connection going offline, and/or the like) that may cause delays in access times for the FIB. This prevents control plane packets transmitted in the control plane session from being delayed, which prevents the network event from causing additional network events and/or negative effects in the network, in the network device, and/or the like. In this way, memory, processing, and networking resources that would have otherwise been consumed on repairing the network events and/or negative effects are preserved, network uptime and availability are maintained, and network reliability is improved.

In some implementations, the FIB and/or FIB cache may be included in the data plane component instead of, or in addition to, the control plane component. In this case, FIB and/or FIB cache lookup may be performed by the data plane component for control plane packet forwarding. For example, the network device may receive a control plane packet, may perform a FIB or FIB cache lookup to determine a next hop in a route to a destination associated with the control plane packet, and may transmit the control plane packet to the control plane of the network device (e.g., on the internal connection between the control plane and the data plane component) based on determining that the control plane is the destination (and thus the next hop) of the control plane packet. As another example, the control plane may generate a control plane packet, include destination information in the control plane packet, transmit the control plane packet to the data plane component (e.g., on the internal connection between the control plane and the data plane component), and the data plane component may determine the next hop for the control plane packet by performing a lookup in the FIB or FIB cache.

Turning now to FIG. 1A, as shown by reference number 102, the control plane may configure one or more FIB caching rules for using the FIB cache to process a control plane session. In some implementations, the control plane may configure a FIB caching rule that specifies all control plane sessions associated with the network device are to be processed using the FIB cache. In some implementations, the control plane may configure the one or more FIB caching rules based on a control plane session type, so that some types of control plane sessions are processed using the FIB cache, and some other types of control plane sessions are processed using the FIB. For example, the control plane may configure a FIB caching rule that specifies a control plane session originating and terminating internal to the network device, such as a control plane session between the control plane and the data plane component, is to be processed by the FIB cache. As another example, the control plane may configure a FIB caching rule that specifies a control plane session associated with BGP is to be processed using the cache. As another example, the control plane may configure a FIB caching rule that specifies a control plane session associated with a bidirectional forwarding detection (BFD) protocol is to be processed using the cache. As another example, the control plane may configure a FIB caching rule that specifies a control plane session associated with exception traffic (e.g., simple network management protocol (SNMP) traffic, data plane traffic that is redirected to the control plane (e.g., an IP packet including option field information in a header of the IP packet), Internet control message protocol (ICMP) error traffic, and/or the like) is not to be processed using the FIB cache. As another example, the control plane may configure a FIB caching rule that specifies a control plane session associated with user datagram protocol (UDP) communications between the network device and a particular destination (e.g., neighbor device 1), is to be processed using the FIB cache. In some implementations, a user (e.g., a network administrator) may configure the one or more FIB caching rules. In some implementations, a network management device (e.g., a network administrator device) may configure the one or more FIB caching rules.

In some implementations, the control plane may dynamically modify the one or more FIB caching rules based on various factors. For example, the control plane may detect that a network event in the network has occurred (e.g., a route reconfiguration event, a route unavailable event, and/or the like), and may determine to modify a FIB caching rule (e.g., by changing a FIB caching rule specifying that a control plane session associated with ICMP error messaging is not to be processed using the FIB cache so that the FIB caching rule specifies that the control plane session associated with ICMP error messaging is to be processed using the FIB cache). In this way, the control plane may dynamically accommodate changes in the network as the changes occur. As another example, the control plane may detect that the FIB cache is being underutilized (e.g., the unused storage in the FIB cache satisfies a lower storage threshold, such as 50% unused, 30% unused, etc.) or overutilized (e.g., the used storage in the FIB cache satisfies an upper storage threshold, such as 90% used, 95% used, 100% used, etc.), and may modify the one or more FIB caching rules so that greater or fewer control plane session types are processed using the FIB cache. In this way, the control plane may allow a greater quantity of control plane sessions to be processed using the FIB cache when the FIB cache is being underutilized, and may prioritize particular types of control plane sessions when the FIB cache is being overutilized.

As shown by reference numbers 104 (e.g., 104-1 through 104-n, collectively referred to as "control plane sessions 104"), the control plane may establish various control plane sessions. For example, the control plane may establish a control plane session between the control plane and the data plane component of the network device (i.e., control plane session 104-1), between the control plane and neighbor device 1 (i.e., control plane session 104-2), between the control plane and neighbor device 2 (i.e., control plane session 104-3), and so on. It is to be understood that no temporal relationship is intended in the diagram illustrated in FIG. 1A, and that one or more of control plane sessions 104 may be established at the same or similar times, may be established at different times, may exist at the same or similar times, may exist at different times, and/or the like.

In some implementations, the network device may initiate establishment of a control plane session (e.g., control plane session 104-2) by opening a socket on the network device and transmitting a request to a neighbor device (e.g., neighbor device 1) to open a socket for the control plane session on the neighbor device. In some implementations, the network device may receive a request from a neighbor device (e.g., neighbor device 2) to establish a control plane session between the network device and the neighbor device, and may open a socket on the network device based on receiving the request.

Figure 1B:
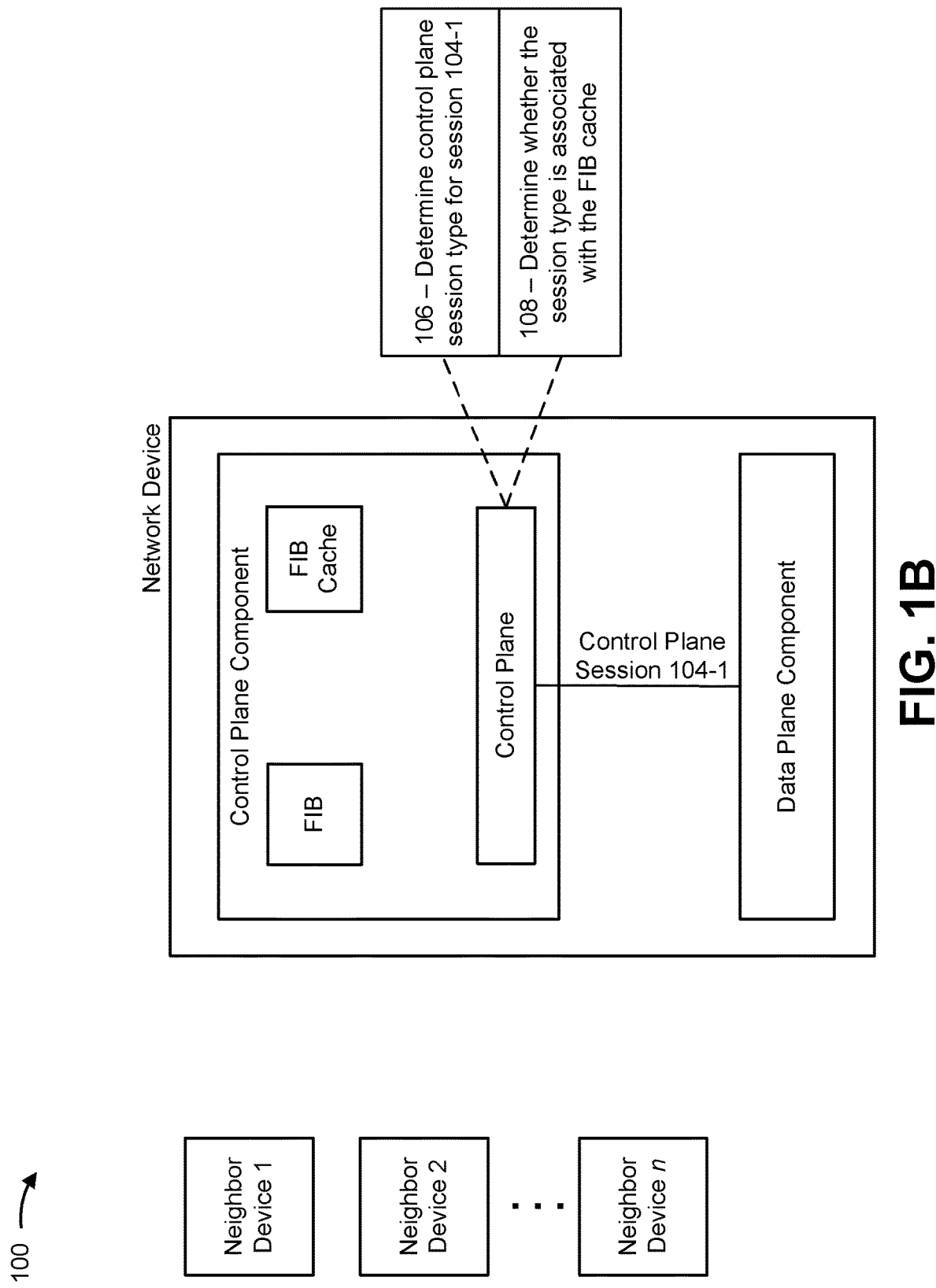

Turning now to FIG. 1B, as shown by reference number 106, the control plane may determine a control plane session type associated with the control plane session between the control plane and the data plane component of the network device (e.g., control plane session 104-1). The control plane may determine the control plane session type associated with control plane session 104-1 based on various factors. In some implementations, the control plane may determine the control plane session type based on source and/or destination information associated with control plane session 104-1 (e.g., port information, address information, and/or the like).

As an example, the control plane may determine the control plane session type based on an address (e.g., an IP address and/or the like) associated with the data plane component. The control plane may learn the date plane component's address during establishment of control plane session 104-1. For example, the control plane and the data plane component may establish control plane session 104-1 using a transmission control protocol (TCP) three-way handshake, where the control plane and the data plane component may exchange SYN, SYN-ACK, and ACK packets. The control plane may analyze a packet (e.g., a SYN packet) to determine the source address and/or destination of the packets, which may be the address associated with the data plane component. The control plane may determine that the control plane session type associated with control plane session 104-1 is a control plane session internal to the network device based on determining that a source address or destination of a packet exchanged during the TCP three-way handshake is the address of the data plane component.

In some implementations, the control plane may determine the control plane session type based on analyzing a control plane packet transmitted in control plane session 104-1. For example, the control plane may analyze the control plane packet, and may determine that the control plane packet is a keepalive packet transmitted by the data plane component (e.g., a keepalive packet used to determine whether the connection between the control plane and the data plane component is operational). Accordingly, the control plane may determine that the control plane session type of control plane session 104-1 is a control plane session internal to the network device based on determining that the control plane packet is a keepalive packet transmitted by the data plane component.

As shown by reference number 108, the control plane may determine whether the control plane session type, associated with control plane session 104-1, is associated with the FIB cache. That is, the control plane may determine whether the control plane is to process control plane session 104-1 using the FIB cache based on the control plane session type associated with control plane session 104-1. In some implementations, the control plane may determine whether the control plane session type, associated with control plane session 104-1, is associated with the FIB cache based on the one or more FIB caching rules. For example, the control plane may determine that control plane session 104-1 is an internal control plane session between the control plane and the data plane component, and may identify a FIB caching rule, of the one or more FIB caching rules, that specifies that the internal control plane session between a control plane and a data plane component is to be processed using the FIB cache.

Figure 1C:
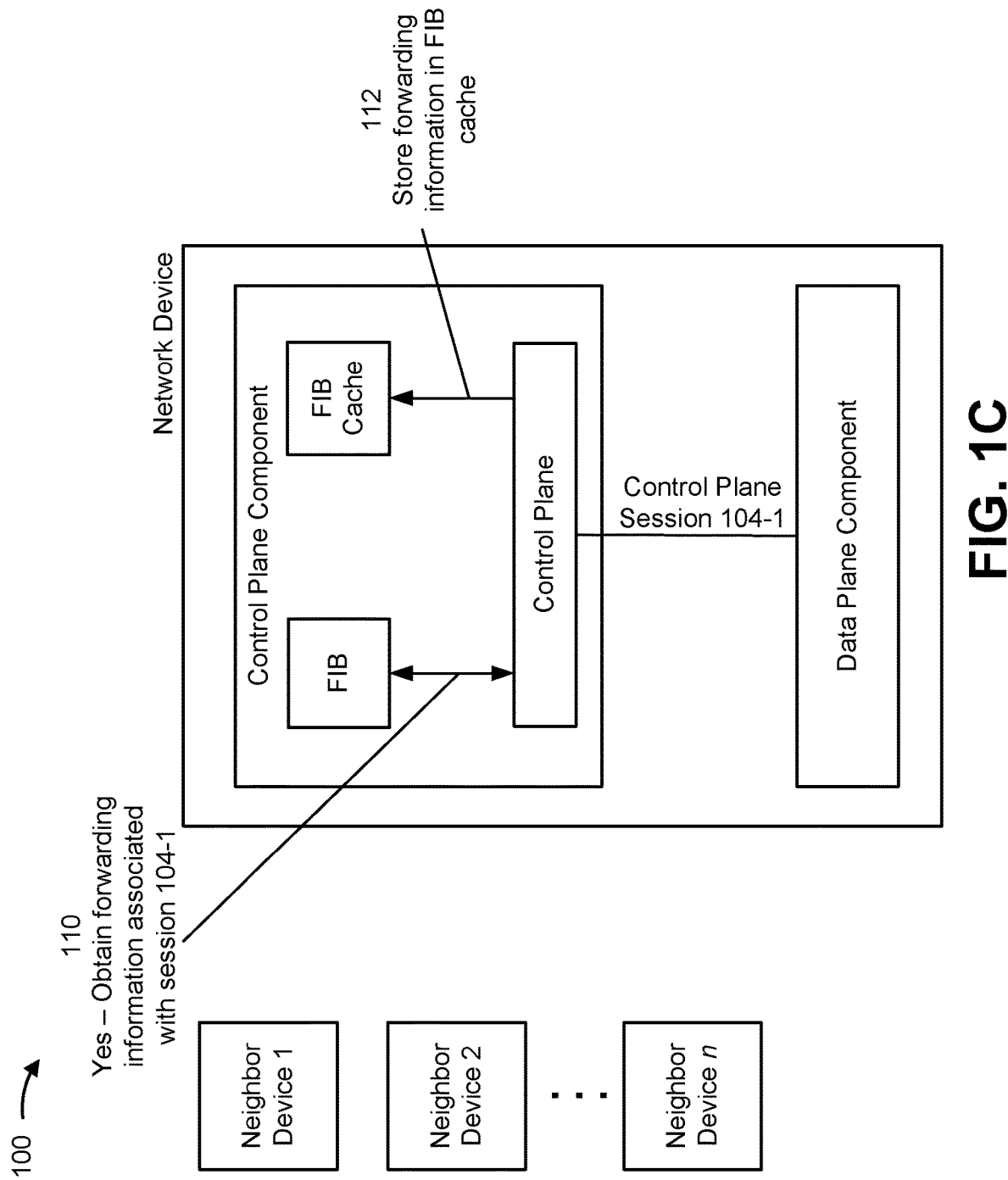

Turning now to FIG. 1C, assuming that the control plane determined that control plane session 104-1 is associated with the FIB cache, and as shown by reference number 110, the control plane may obtain forwarding information associated with control plane session 104-1 from the FIB. For example, the control plane may identify, in the FIB, forwarding information associated with the control plane and forwarding information associated with the data plane component, and may generate a copy of the forwarding information associated with the control plane and a copy of the forwarding information associated with the data plane component.

In some implementations, the copy of the forwarding information associated with the control plane may include a subset of the forwarding information, in the FIB, associated with the control plane, and/or the copy of the forwarding information associated with the data plane component may include a subset of the forwarding information, in the FIB, associated with the data plane component. For example, the forwarding information, associated with the data plane component, stored in the FIB may include information identifying an address associated with the data plane component, information identifying a port associated with the data plane component, information identifying a next hop in a route to the data plane component, information identifying a physical device associated with the data plane component, information identifying a logical device associated with the data plane component, information identifying an address family associated with the data plane component, and/or the like. The control plane component may include a subset of the forwarding information, in the FIB, associated with the data plane component in the copy of the forwarding information associated with the data plane component. For example, the subset of the forwarding information, in the FIB, associated with the data plane component may include the information identifying the address associated with the data plane component, the information identifying the port associated with the data plane component, and information identifying the next hop in the route to the data plane component. In this way, the control plane conserves storage resources of the FIB cache by including, in the subset of the forwarding information, forwarding information used to transmit a control plane packet to the next hop.

As shown by reference number 112, the control plane may store the forwarding information, associated with control plane session 104-1, in the FIB cache. For example, the control plane may store, in the FIB cache, the copy of the forwarding information associated with the control plane and the copy of the forwarding information associated with the data plane component.

In some implementations, when storing the copy of the forwarding information associated with the control plane and/or the copy of the forwarding information associated with the data plane component, the control plane may determine that there are insufficient storage resources for storing the copy of the forwarding information associated with the control plane and/or the copy of the forwarding information associated with the data plane component in the FIB cache. In this case, the control plane may purge (i.e., remove) information stored in the FIB cache to accommodate the copy of the forwarding information associated with the control plane and/or the copy of the forwarding information associated with the data plane component. The control plane may use various techniques to determine which information to purge from the FIB cache. For example, the control plane may determine which information to purge from the FIB cache using a least recently used (LRU) cache algorithm (e.g., to purge information in the FIB cache having a greatest time duration since the information was last accessed), using a least frequently used (LFU) cache algorithm (e.g., to purge information in the FIB cache having a fewest quantity of accesses in a particular time duration), and/or the like.

Figure 1D:
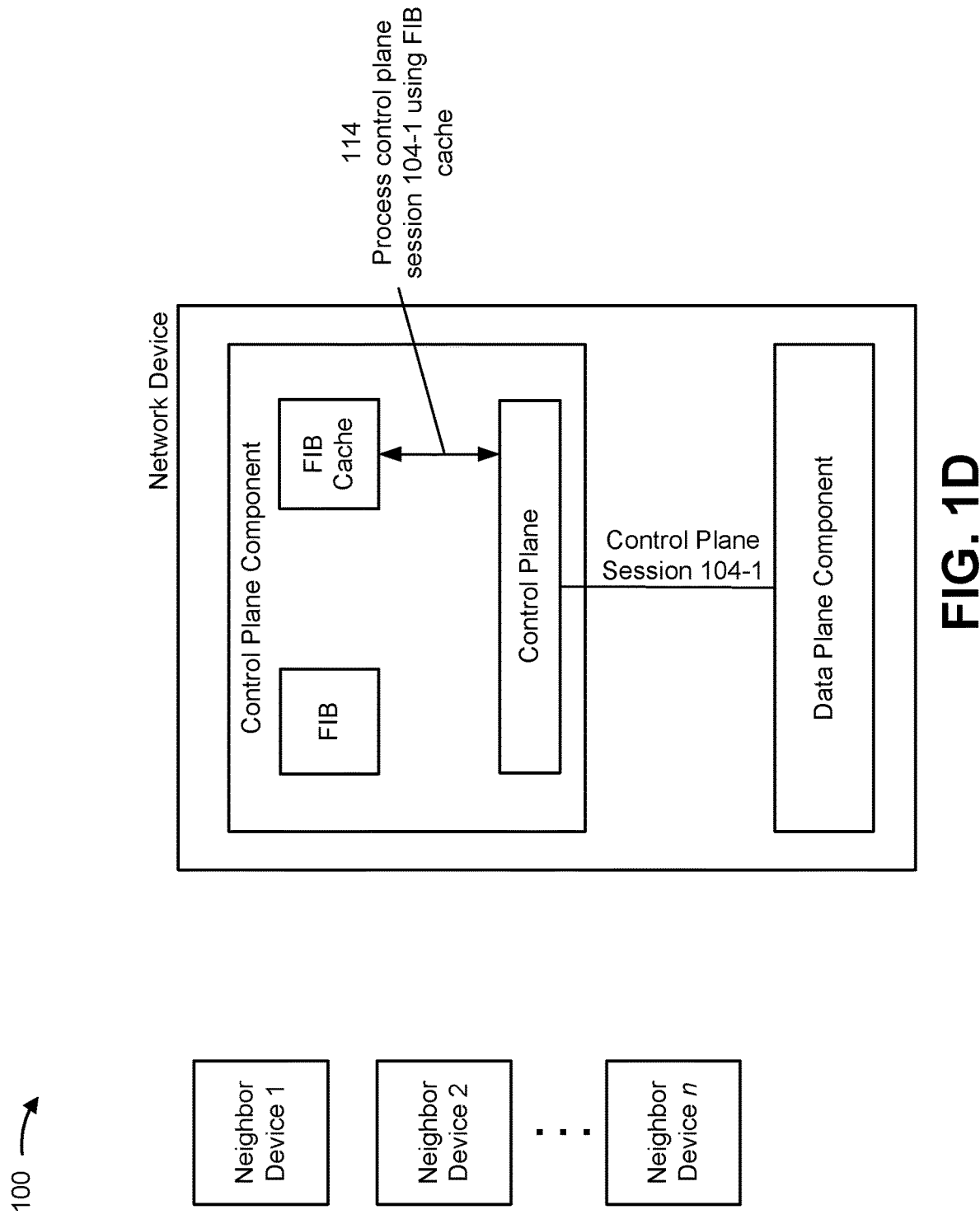

Turning now to FIG. 1D, and as shown by reference number 114, the control plane may process control plane session 104-1 using the forwarding information, associated with control plane session 104-1 stored in the FIB cache. In some implementations, the control plane may process control plane session 104-1 using the forwarding information stored in the FIB cache by generating a control plane packet associated with control plane session 104-1, determining a destination associated with the control plane packet (i.e., the data plane component), identifying forwarding information, associated with the destination, included in the FIB cache, and transmitting the control plane packet based on the forwarding information included in the FIB cache. In some implementations, the forwarding information may include information identifying a next hop in a route to the destination, and the control plane may transmit the control plane packet to the next hop based on the information identifying the next hop.

In this way, the control plane may process control plane session 104-1 using the FIB cache. In this way, if a network event occurs, the control plane may be able to process control plane session 104-1 in a way that prevents control plane packets transmitted in control plane session 104-1 from being delayed and/or dropped altogether. This ensures that the control plane component and/or the data plane component is not taken offline due to delayed and/or dropped keepalive packets. This conserves memory, processing, and networking resources that would have otherwise been consumed on repairing additional network events and/or negative effects that would have occurred if the control plane component and/or the data plane component were to be taken offline. Moreover, this maintains network uptime and availability, as well as improves network reliability.

In some implementations, after transmitting the control plane packet in control plane session 104-1, the control plane may terminate control plane session 104-1. The control plane may terminate control plane session 104-1 based on, for example, receiving a request from the data plane component to terminate control plane session 104-1 (e.g., a TCP FIN packet), based on receiving a quantity of control plane packets in a particular time period, on control plane session 104-1, that does not satisfy a threshold quantity of control plane packets, and/or the like. To terminate control plane session 104-1, the control plane may close the socket associated with control plane session 104-1 and/or remove the forwarding information, associated with the data plane component, stored in the FIB cache. In this way, the control plane may remove forwarding information, associated with unused and/or closed control plane sessions, from the FIB cache to free up FIB cache resources so that the control plane may process new control plane sessions using the FIB cache.

Figure 1E:
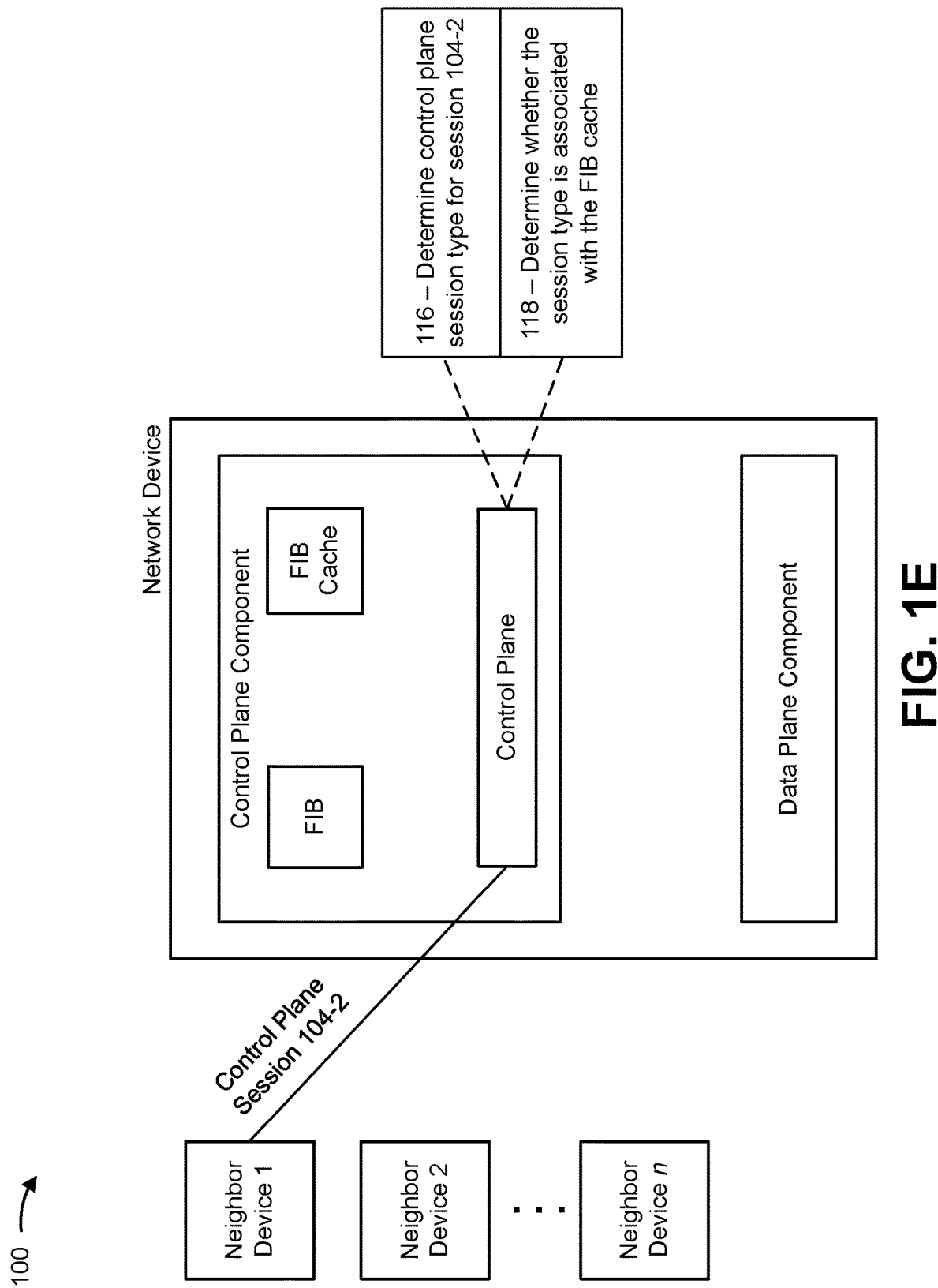

Turning now to FIG. 1E, and as shown by reference number 116, the control plane may determine a control plane session type associated with the control plane session between the control plane and neighbor device 1 (e.g., control plane session 104-2). The control plane may determine the control plane session type associated with control plane session 104-2 based on various factors. In some implementations, the control plane may determine the control plane session type based on source and/or destination information associated with control plane session 104-2 (e.g., port information, address information, and/or the like). As an example, the control plane may determine the control plane session type based on a port identifier associated with control plane session 104-2. The Internet assigned numbers authority (IANA) officially assigns port numbers to various types of communications protocols. For example, port number 179 may be officially assigned to BGP, port number 3784 may be officially assigned to BFD, and so on. Accordingly, the control plane may determine that control plane session 104-2 is associated with port number 179, and may therefore determine that control plane session 104-2 is a BGP control plane session.

In some implementations, the control plane may determine the control plane session type based on analyzing a control plane packet transmitted in control plane session 104-2. For example, the control plane may analyze a header of the control plane packet to determine protocol information included in the header. The protocol information may include, for example, a protocol identifier associated with ICMP (e.g., protocol 0x01). Accordingly, the control plane may determine that the control plane session type of control plane session 104-2 is an ICMP control plane session based on the protocol identifier. As another example, the control plane may analyze a payload of the control plane packet, and may determine the control plane session type associated with control plane session 104-2 based on the payload. For example, the control plane may determine that the payload of the control plane packet includes IS-IS protocol information, and may therefore determine that the control plane session type of control plane session 104-2 is an IS-IS protocol control plane session.

As shown by reference number 118, the control plane may determine whether the control plane session type, associated with control plane session 104-2, is associated with the FIB cache. That is, the control plane may determine whether the control plane is to process control plane session 104-2 using the FIB cache based on the control plane session type associated with control plane session 104-2. In some implementations, the control plane may determine whether the control plane session type, associated with control plane session 104-2, is associated with the FIB cache based on the one or more FIB caching rules. For example, the control plane may determine that control plane session 104-2 is a BGP control plane session between the control plane and neighbor device 1, and may identify a FIB caching rule, of the one or more FIB caching rules, that specifies that the BGP control plane session between a control plane and a neighbor device 1 is to be processed using the FIB cache.

Figure 1F:
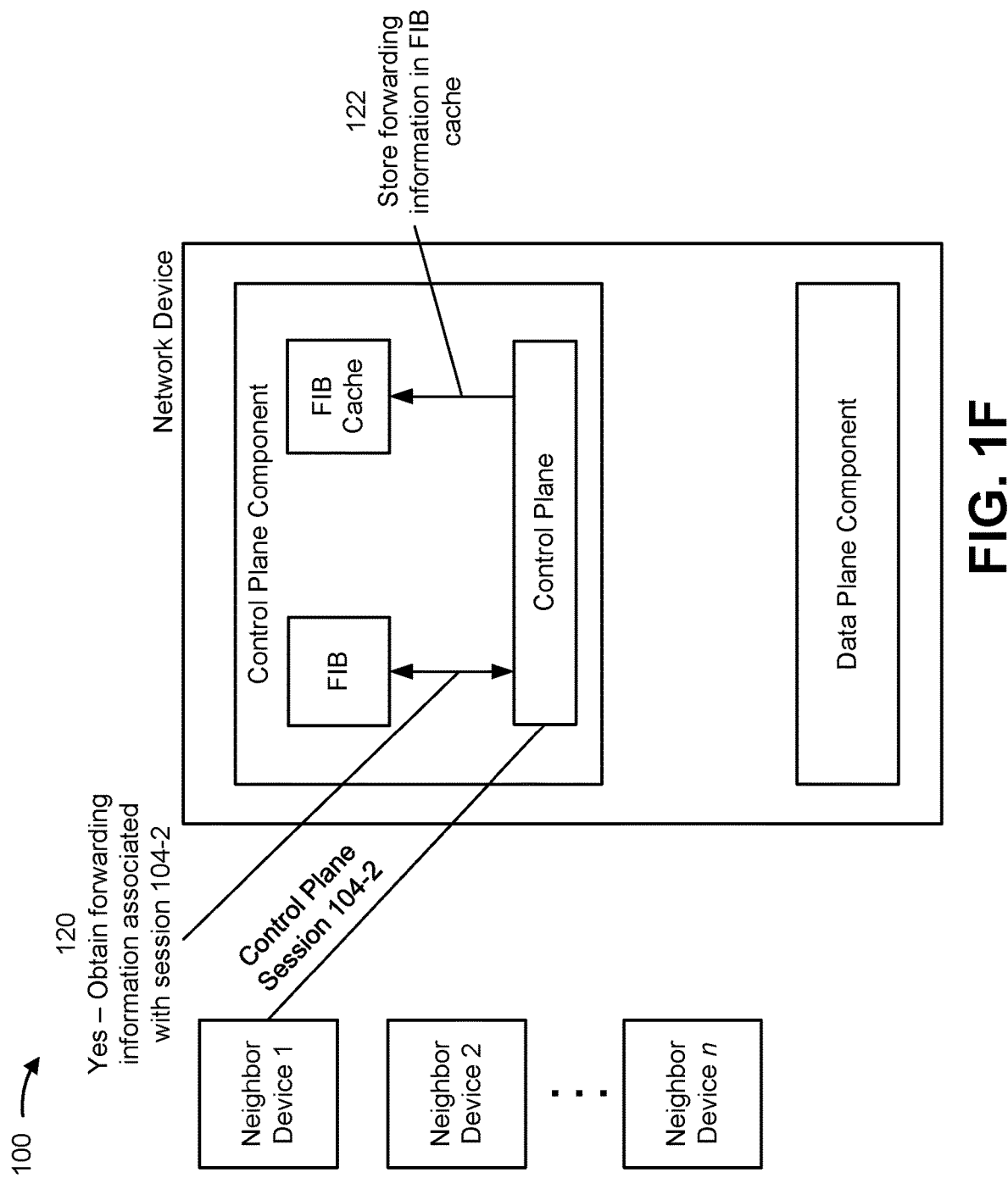

Turning now to FIG. 1F, assuming that the control plane session determined that control plane session 104-2 is associated with the FIB cache, and as shown by reference number 120, the control plane may obtain forwarding information associated with control plane session 104-2 from the FIB. In some implementations, the control plane may obtain forwarding information, associated with control plane session 104-2, from the FIB, in a manner similar to that described above in connection with control plane session 104-1.

As shown by reference number 122, the control plane may store the forwarding information, associated with control plane session 104-2, in the FIB cache. In some implementations, the control plane may store the forwarding information, associated with control plane session 104-2, in the FIB cache, in a manner similar to that described above in connection with control plane session 104-1.

Figure 1G:
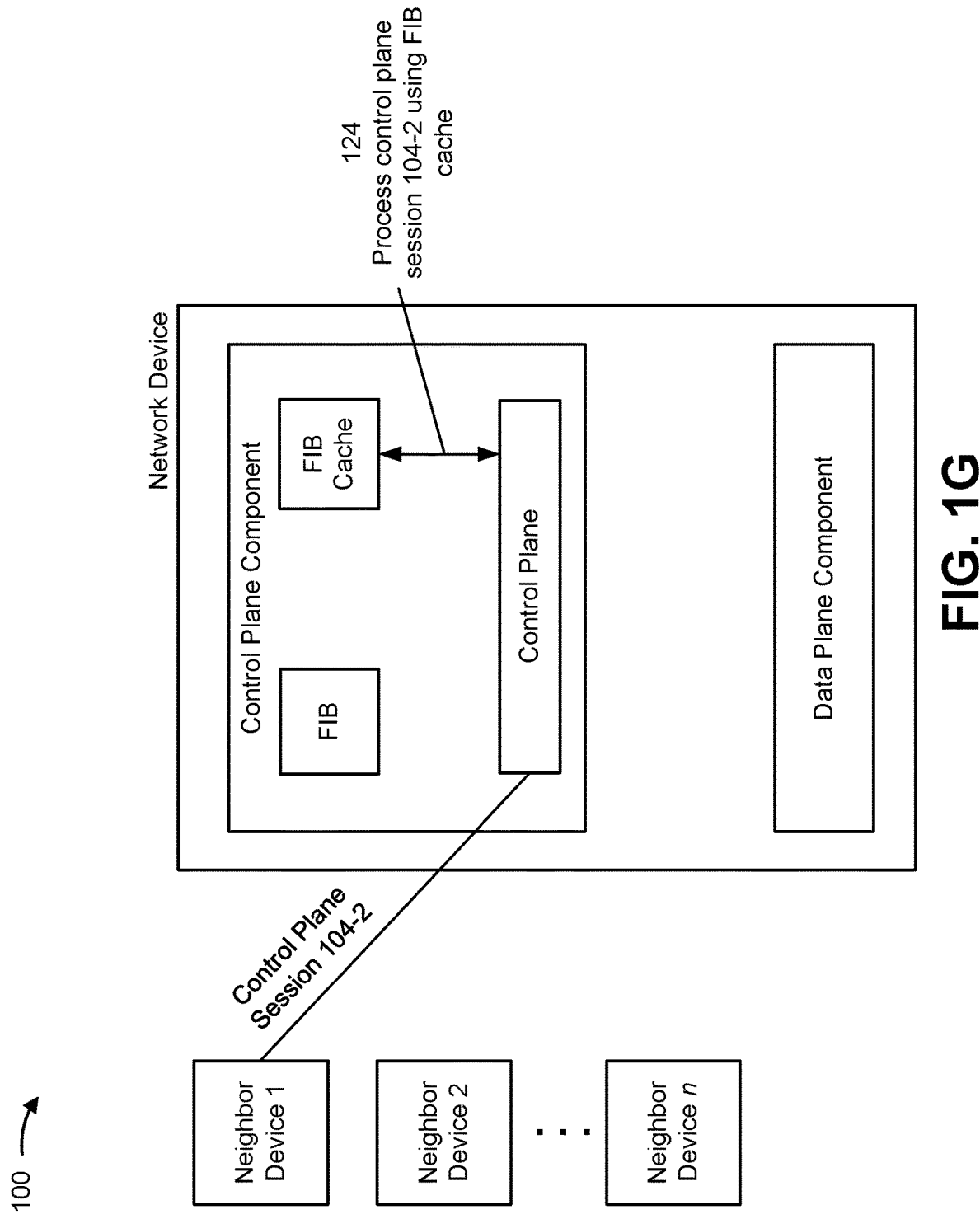

Turning now to FIG. 1G, and as shown by reference number 124, the control plane may process control plane session 104-2 using the forwarding information, associated with control plane session 104-2 stored in the FIB cache. In some implementations, the control plane may process control plane session 104-2 using the forwarding information stored in the FIB cache by generating a control plane packet associated with control plane session 104-2, determining a destination associated with the control plane packet (i.e., neighbor device 1), identifying forwarding information, associated with the destination, included in the FIB cache (e.g., by performing a lookup in the FIB cache), and transmitting the control plane packet based on the forwarding information included in the FIB cache. In some implementations, the forwarding information may include information identifying a next hop in a route to the destination, and the control plane may transmit the control plane packet to the next hop based on the information identifying the next hop.

In some implementations, the control plane may update the forwarding information, in the FIB cache, associated with the destination. For example, the control plane may determine that a next hop in a route to neighbor device 1 has changed (e.g., from next hop A to next hop B). Based on determining the change, the control plane may update the forwarding information, in the FIB, associated with neighbor device 1. For example, the control plane may update information associated with the next hop included in the forwarding information associated with neighbor device 1 (e.g., by updating the information associated with the next hop to identify next hop B). The control plane may determine that forwarding information associated with neighbor device 1 has been copied and stored in the FIB cache (e.g., based on updating the forwarding information, in the FIB, associated with neighbor device 1). Based on determining that forwarding information associated with neighbor device 1 has been copied and stored in the FIB cache, the control plane may update the forwarding information, associated with neighbor device 1, in the FIB cache to reflect the update to the forwarding information, associated with neighbor device 1, in the FIB.

After updating the forwarding information, associated with neighbor device 1, in the FIB cache, the control plane may generate another control plane packet associated with control plane session 104-2, determine a destination associated with the other control plane packet (i.e., neighbor device 1), identify forwarding information, associated with the destination, included in the FIB cache (i.e., the updated forwarding information associated with neighbor device 1), and may transmit the other control plane packet based on the updated forwarding information included in the FIB cache. In this way, the control plane ensures that forwarding information stored in the FIB cache is current, which ensures that control plane packets intended for the destination are transmitted to the correct next hop and not delayed or dropped.

Figure 1H:
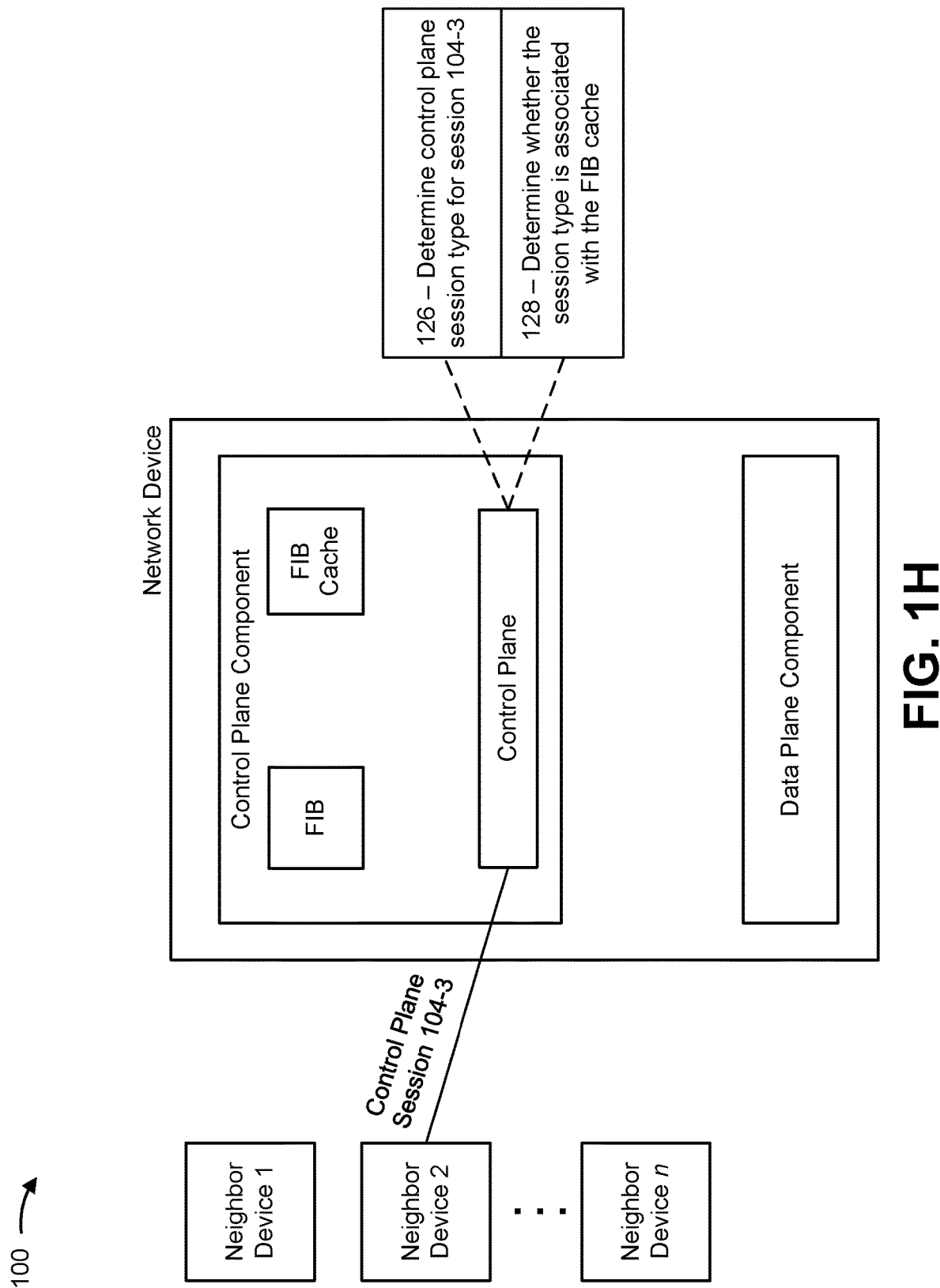

Turning now to FIG. 1H, and as shown by reference number 126, the control plane may determine a control plane session type associated with the control plane session between the control plane and neighbor device 2 (control plane session 104-3). The control plane may determine the control plane session type associated with control plane session 104-3 based on the various factors described above in connection with control plane session 104-1 and/or control plane session 104-2. For example, the control plane may determine that the control plane session type associated with control plane session 104-3 is an ICMP control plane session type.

As shown by reference number 128, the control plane may determine whether the control plane session type, associated with control plane session 104-3, is associated with the FIB cache. That is, the control plane may determine whether the control plane is to process control plane session 104-3 using the FIB cache based on the control plane session type associated with control plane session 104-3. In some implementations, the control plane may determine whether the control plane session type, associated with control plane session 104-3, is associated with the FIB cache based on the one or more FIB caching rules. For example, assuming that the control plane determined that control plane session 104-3 is an ICMP control plane session type, the control plane may identify a FIB caching rule, of the one or more FIB caching rules, that specifies that an ICMP control plane session is not to be processed using the FIB cache and instead is to be processed using the FIB.

Figure 1I:
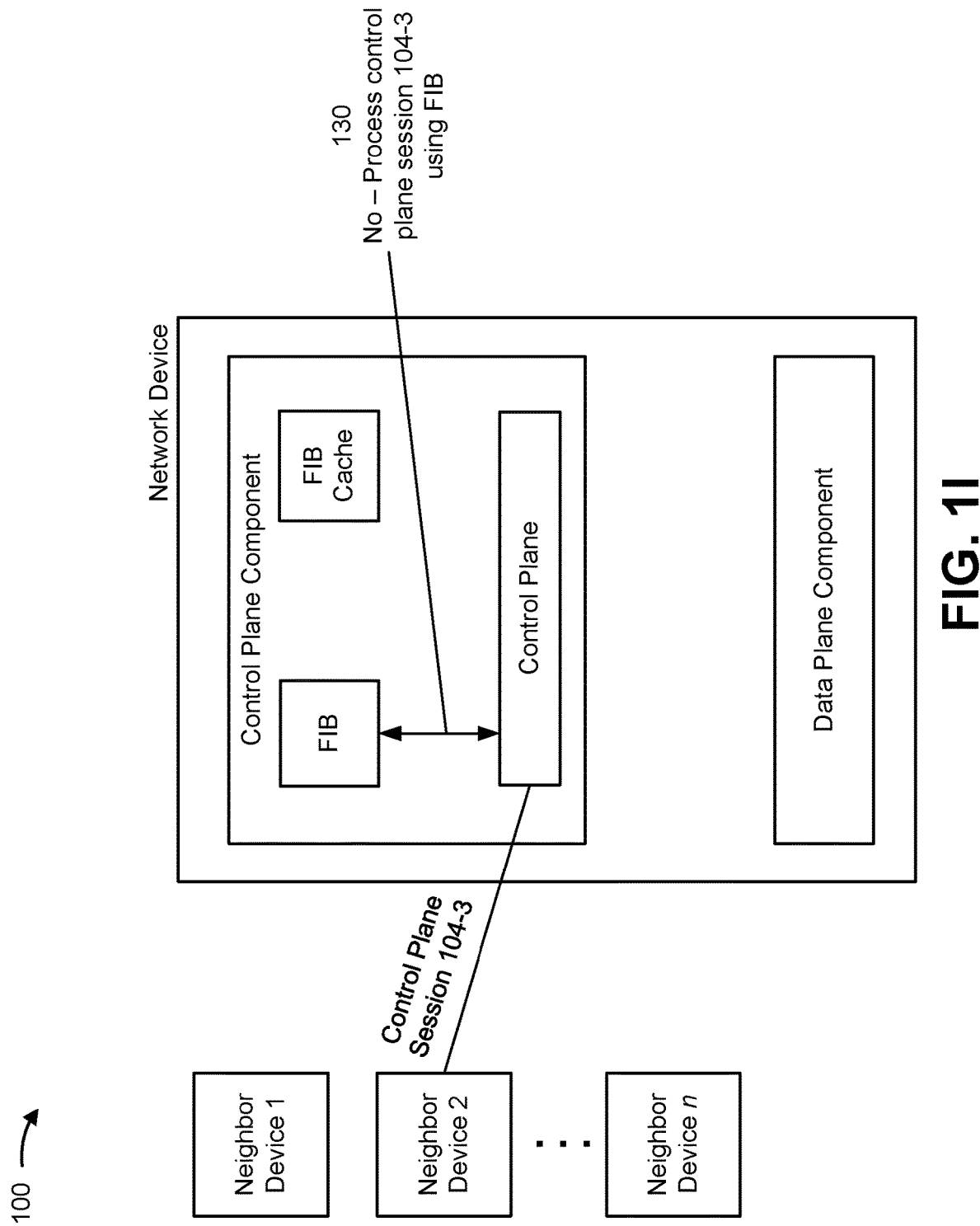

Turning now to FIG. 1I, assuming that the control plane session determined that control plane session 104-3 is not associated with the FIB cache, and as shown by reference number 130, the control plane may process control plane session 104-3 using the forwarding information, associated with control plane session 104-3, stored in the FIB. In some implementations, the control plane may process control plane session 104-3 using the forwarding information stored in the FIB by generating a control plane packet associated with control plane session 104-3, determining a destination associated with the control plane packet (i.e., neighbor device 2), identifying forwarding information, associated with the destination, included in the FIB (e.g., by performing a lookup in the FIB), and transmitting the control plane packet based on the forwarding information included in the FIB. In some implementations, the forwarding information may include information identifying a next hop in a route to the destination, and the control plane may transmit the control plane packet to the next hop based on the information identifying the next hop.

In this way, the control plane may flexibly process particular control plane sessions using the FIB cache (e.g., control plane session 104-1 and control plane session 104-2) and/or the FIB (e.g., control plane session 104-3). This allows the control plane to prioritize FIB cache resources (e.g., storage resources, lookup queue resources, and/or the like) based on the one or more FIB caching rules, which conserves the FIB cache resources and ensures that FIB cache resources are available for particular types of control plane sessions.

As indicated above, FIGS. 1A-1I are provided merely as an example. Other examples are possible and may differ from what was described with regard to FIGS. 1A-1I.

Figure 2:
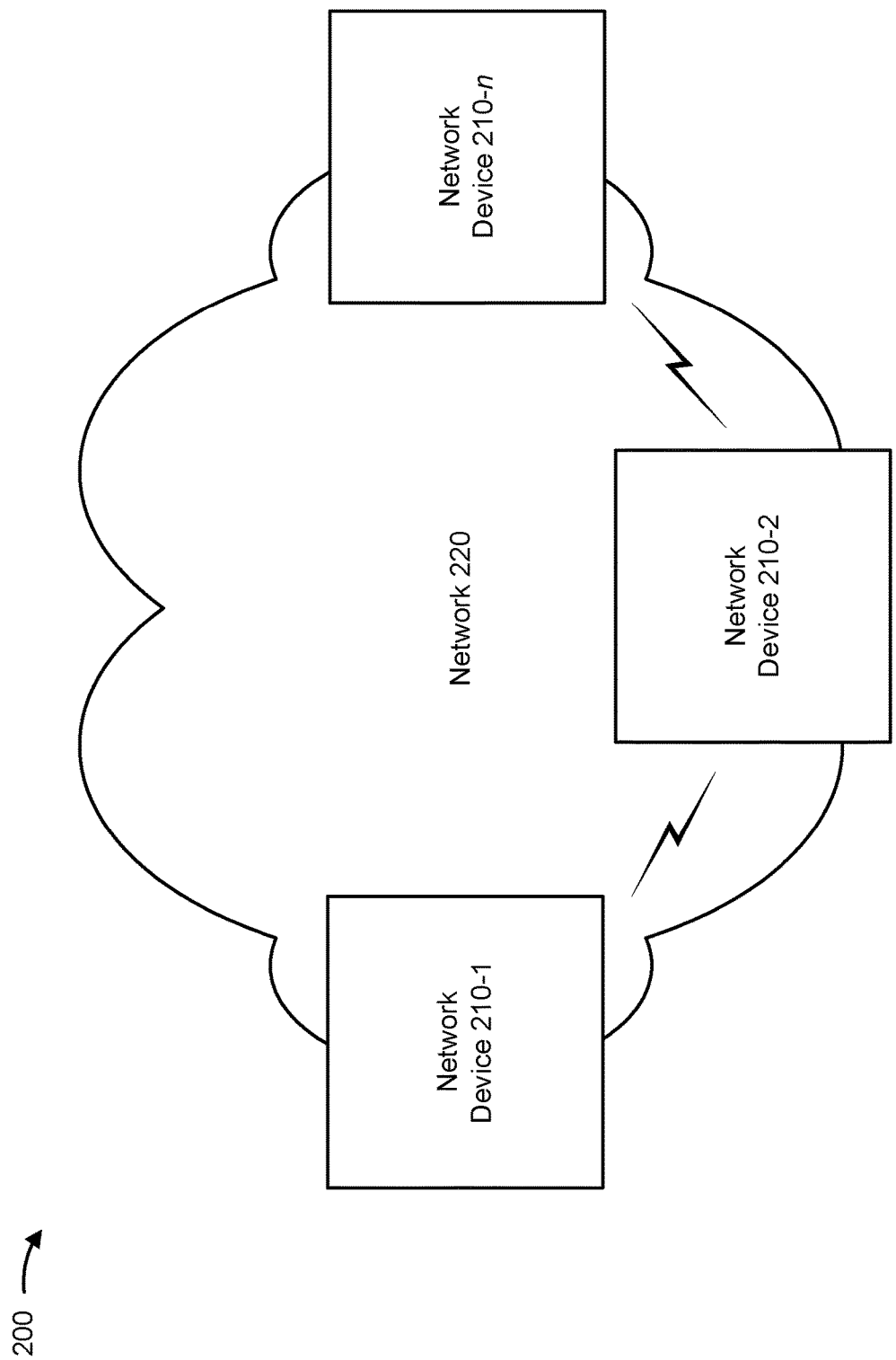
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-n (n≥1) (hereinafter referred to collectively as "network devices 210," and individually as "network device 210") and a network 220. Devices of environment 200 may interconnect via wired connections, wireless connections, or a combination of wired and wireless connections.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center.

In some implementations, network device 210 may include a data plane component and a control plane component, as described herein. In some implementations, network device 210 may, using the control plane component, interact with the data plane component and/or with one or more neighbor devices, such as via a control plane session associated with the data plane component or associated with one of the neighbor devices. In some implementations, the control plane component of network device 210 may include a control plane, a FIB, and a FIB cache. The control plane may determine a control plane session type for a control plane session with the data plane component internal to network device 210 or with a neighbor device external to network device 210. If the control plane session type is associated with the FIB cache, the control plane may obtain, from the FIB, forwarding information associated with the control plane session, may store the forwarding information in the FIB cache, and may process the control plane session using the FIB cache. If the control plane session type is not associated with the FIB cache, the control plane may process the control plane session using the FIB.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of cellular network, etc.), a public land mobile network (PLMN), a LAN, a WAN, a metropolitan area network (MAN), a telephone network (e.g., a public switched telephone network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
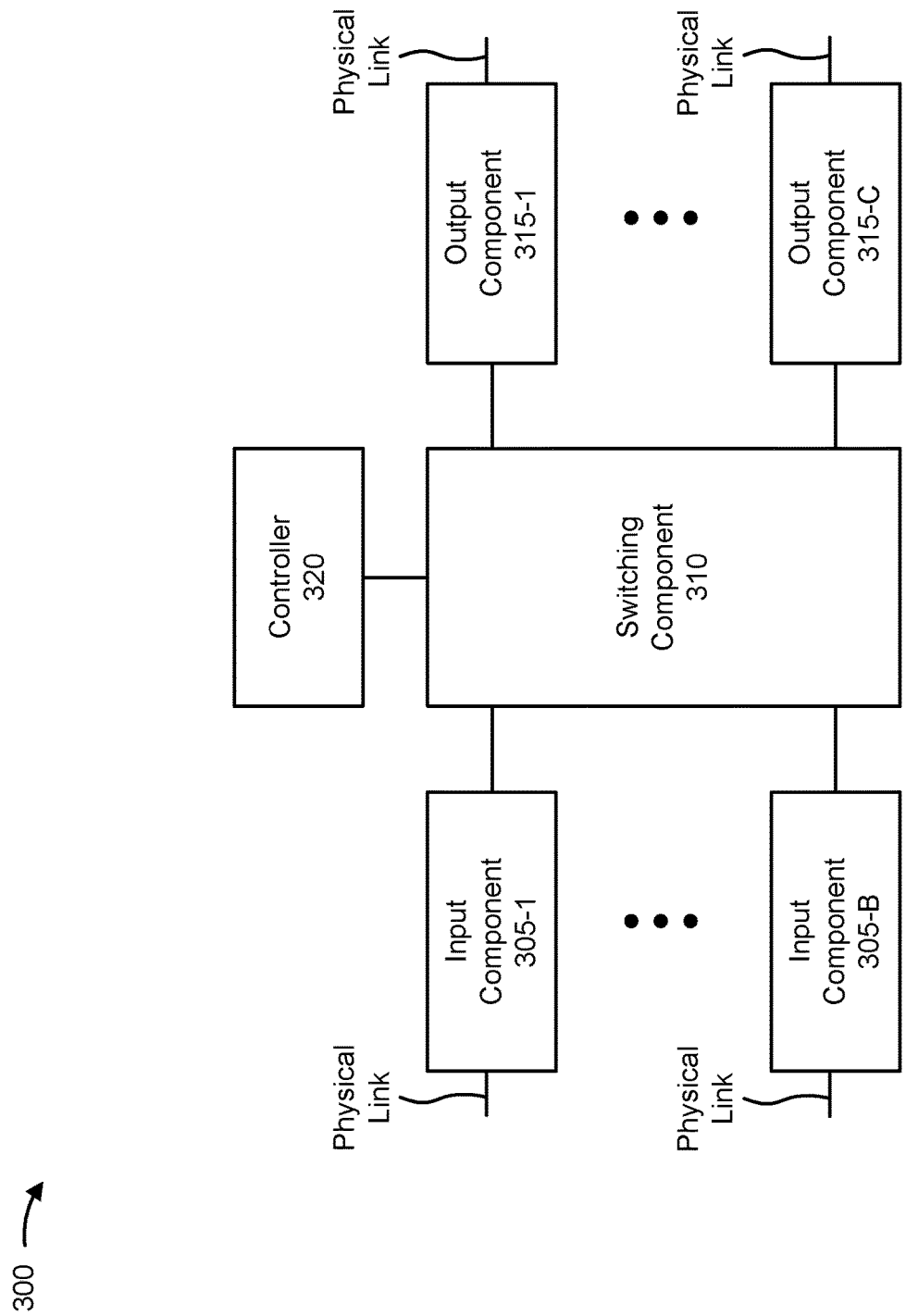
FIG. 3 is a diagram of example components of one or more devices of FIG. 2.

FIG. 3 is a diagram of example components of a device 300. Device 300 may correspond to one or more of network devices 210. In some implementations, one or more of network devices 210 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for FIB caching. In some implementations, one or more process blocks of FIG. 4 may be performed by a network device (e.g., network device 210). In some implementations, one or more process blocks of FIG. 4 may be performed by a plurality of network devices, by another device, and/or by a group of devices separate from or including the network device.

As shown in FIG. 4, process 400 may include determining a control plane session type associated with a control plane session (block 410). For example, the network device (e.g., network device 210, using input component 305, switching component 310, output component 315, controller 320, and/or the like) may determine a control plane session type associated with a control plane session, as described above in connection with FIGS. 1A-1I. In some implementations, the control plane session may be associated with the network device.

As further shown in FIG. 4, process 400 may include determining whether the control plane session type is associated with a FIB cache on the network device (block 420). For example, the network device (e.g., network device 210, using input component 305, switching component 310, output component 315, controller 320, and/or the like) may determine whether the control plane session type is associated with a FIB cache on the network device, as described above in connection with FIGS. 1A-1I.

As further shown in FIG. 4, process 400 may include obtaining, based on determining that the control plane session type is associated with the FIB cache, forwarding information associated with the control plane session (block 430). For example, the network device (e.g., network device 210, using input component 305, switching component 310, output component 315, controller 320, and/or the like) may obtain, based on determining that the control plane session type is associated with the FIB cache, forwarding information associated with the control plane session, as described above in connection with FIGS. 1A-1I. In some implementations, the forwarding information may be stored in a FIB, associated with the FIB cache, on the network device.

As further shown in FIG. 4, process 400 may include storing the forwarding information in the FIB cache (block 440). For example, the network device (e.g., network device 210, using input component 305, switching component 310, output component 315, controller 320, and/or the like) may store the forwarding information in the FIB cache, as described above in connection with FIGS. 1A-1I.

As further shown in FIG. 4, process 400 may include processing the control plane session using the forwarding information stored in the FIB cache (block 450). For example, the network device (e.g., network device 210, using input component 305, switching component 310, output component 315, controller 320, and/or the like) may process the control plane session using the forwarding information stored in the FIB cache, as described above in connection with FIGS. 1A-1I.

Process 400 may include additional implementations, such as any single implementation or any combination of implementations described below and/or described with regard to any other process described herein.

In some implementations, when determining whether the control plane session type is associated with the FIB cache, the network device may determine whether the control plane session type is associated with the FIB cache based on one or more FIB caching rules associated with the control plane session type.

In some implementations, the control plane session may be an internal control plane session between a control plane and a data plane of the network device and, when determining the control plane session type associated with the control plane session, the network device may determine that the control plane session type is an internal control plane session type.

In some implementations, when determining whether the control plane session type is associated with the FIB cache, the network device may determine that the control plane session type is associated with the FIB cache based on a FIB caching rule specifying that the internal control plane session type is to be processed using the FIB cache.

In some implementations, when determining whether the control plane session type is associated with the FIB cache, the network device may determine that the control plane session type is associated with the FIB cache based on the control plane session type being an internal Ethernet interface control plane session type, a BGP control plane session type, a BFD control plane session type, and/or a UDP control plane session type associated with a particular destination.

In some implementations, when determining whether the control plane session type is associated with the FIB cache, the network device may determine that the control plane session type is not associated with the FIB cache based on the control plane session type being at least one of a SMNP control plane session type or an ICMP control plane session type.

In some implementations, the forwarding information associated with the control plane session may include at least information identifying a destination associated with the control plane session.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for FIB caching. In some implementations, one or more process blocks of FIG. 5 may be performed by a network device (e.g., network device 210). In some implementations, one or more process blocks of FIG. 5 may be performed by a plurality of network devices, by another device, and/or by a group of devices separate from or including the network device.

As shown in FIG. 5, process 500 may include opening a socket, on the network device, for a control plane session (block 510). For example, the network device (e.g., network device 210, using input component 305, switching component 310, output component 315, controller 320, and/or the like) may open a socket, on the network device, for a control plane session, as described above in connection with FIGS. 1A-1I.

As further shown in FIG. 5, process 500 may include determining, based on opening the socket, a control plane session type associated with the control plane session (block 520). For example, the network device (e.g., network device 210, using input component 305, switching component 310, output component 315, controller 320, and/or the like) may determine, based on opening the socket, a control plane session type associated with the control plane session, as described above in connection with FIGS. 1A-1I.

As further shown in FIG. 5, process 500 may include determining whether the control plane session type is associated with a FIB cache on the network device (block 530). For example, the network device (e.g., network device 210, using input component 305, switching component 310, output component 315, controller 320, and/or the like) may determine whether the control plane session type is associated with a FIB cache on the network device, as described above in connection with FIGS. 1A-1I.

As further shown in FIG. 5, process 500 may include obtaining, based on determining that the control plane session type is associated with the FIB cache, a subset of forwarding information associated with the control plane session (block 540). For example, the network device (e.g., network device 210, using input component 305, switching component 310, output component 315, controller 320, and/or the like) may obtain, based on determining that the control plane session type is associated with the FIB cache, a subset of forwarding information associated with the control plane session, as described above in connection with FIGS. 1A-1I. In some implementations, the subset of forwarding information may be stored in a FIB, associated with the FIB cache, on the network device.

As further shown in FIG. 5, process 500 may include storing the subset of forwarding information in the FIB cache (block 550). For example, the network device (e.g., using input component 305, switching component 310, output component 315, controller 320, and/or the like) may store the subset of forwarding information in the FIB cache, as described above in connection with FIGS. 1A-1I.

As further shown in FIG. 5, process 500 may include generating, after storing the subset of forwarding information in the FIB cache, a packet associated with the control plane session (block 560). For example, the network device (e.g., network device 210, using input component 305, switching component 310, output component 315, controller 320, and/or the like) may generate, after storing the subset of forwarding information in the FIB cache, a packet associated with the control plane session, as described above in connection with FIGS. 1A-1I.

As further shown in FIG. 5, process 500 may include processing the packet using the subset of forwarding information stored in the FIB cache (block 570). For example, the network device (e.g., network device 210, using input component 305, switching component 310, output component 315, controller 320, and/or the like) may process the packet using the subset of forwarding information stored in the FIB cache, as described above in connection with FIGS. 1A-1I.

Process 500 may include additional implementations, such as any single implementation or any combination of implementations described below and/or in connection with one or more other processes described elsewhere herein.

In some implementations, when processing the packet using the subset of forwarding information stored in the FIB cache, the network device may identify, based on the subset of forwarding information stored in the FIB cache, a destination associated with the packet, may identify, based on the subset of forwarding information stored in the FIB cache, a next hop to the destination associated with the packet, and may transmit the packet to the next hop.

In some implementations, the network device may terminate the control plane session after processing the packet, and may remove, based on terminating the control plane session, the subset of forwarding information associated with the control plane session from the FIB cache. In some implementations, the network device, when terminating the control plane session, may close the socket.

In some implementations, the FIB and the FIB cache may be included in separate data structures. In some implementations, the FIB and the FIB cache may be included in separate portions of a same data structure.

In some implementations, when determining whether the control plane session type is associated with the FIB cache, the network device may determine whether the control plane session type is associated with the FIB cache based on one or more FIB caching rules associated with the control plane session type.

In some implementations, the control plane session type may be a BFD protocol control plane session type and, when determining whether the control plane session type is associated with the FIB cache, the network device may determine that the BFD protocol control plane session type is associated with the FIB cache based on a FIB caching rule associating the BFD protocol control plane session type with the FIB cache.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for FIB caching. In some implementations, one or more process blocks of FIG. 6 may be performed by a first network device (e.g., network device 210). In some implementations, one or more process blocks of FIG. 6 may be performed by a plurality of network devices, by another device, and/or by a group of devices separate from or including the first network device.

As shown in FIG. 6, process 600 may include receiving a request to establish a control plane session between the first network device and a second network device (block 610). For example, the first network device (e.g., network device 210, using input component 305, switching component 310, output component 315, controller 320, and/or the like) may receive, at the first network device, a request to establish a control plane session between the first network device and a second network device, as described above in connection with FIGS. 1A-1I.

As further shown in FIG. 6, process 600 may include, based on receiving the request, opening a socket on the first network device for the control plane session, and determining a control plane session type associated with the control plane session (block 620). For example, the first network device (e.g., network device 210, using input component 305, switching component 310, output component 315, controller 320, and/or the like) may, based on receiving the request, open a socket on the first network device for the control plane session, and determine a control plane session type associated with the control plane session, as described above in connection with FIGS. 1A-1I.

As further shown in FIG. 6, process 600 may include determining whether the control plane session type is associated with a FIB cache on the first network device (block 630). For example, the first network device (e.g., network device 210, using input component 305, switching component 310, output component 315, controller 320, and/or the like) may determine whether the control plane session type is associated with a FIB cache on the first network device, as described above in connection with FIGS. 1A-1I.

As further shown in FIG. 6, process 600 may include identifying, based on determining that the control plane session type is associated with the FIB cache, forwarding information associated with the control plane session (block 640). For example, the first network device (e.g., network device 210, using input component 305, switching component 310, output component 315, controller 320, and/or the like) may identify, based on determining that the control plane session type is associated with the FIB cache, forwarding information associated with the control plane session, as described above in connection with FIGS. 1A-1I. In some implementations, the forwarding information may be stored in a FIB, on the first network device, associated with the FIB cache.

As further shown in FIG. 6, process 600 may include storing a copy of the forwarding information in the FIB cache (block 650). For example, the first network device (e.g., network device 210, using input component 305, switching component 310, output component 315, controller 320, and/or the like) may store a copy of the forwarding information in the FIB cache, as described above in connection with FIGS. 1A-1I.

As further shown in FIG. 6, process 600 may include processing the control plane session using the copy of forwarding information stored in the FIB cache (block 660). For example, the first network device (e.g., network device 210, using input component 305, switching component 310, output component 315, controller 320, and/or the like) may process the control plane session using the copy of forwarding information stored in the FIB cache, as described above in connection with FIGS. 1A-1I.

Process 600 may include additional implementations, such as any single implementation or any combination of implementations described below and/or in connection with one or more other processes described elsewhere herein.

In some implementations, the first network device may further detect a change to the forwarding information stored in the FIB, and update the copy of the forwarding information in the FIB cache, to form an updated copy of the forwarding information, based on the change to the forwarding information stored in the FIB.

In some implementations, when processing the control plane session using the copy of forwarding information stored in the FIB cache, the first network device may generate, after updating the copy of the forwarding information stored in the FIB cache, a packet associated with the control plane session, and may process the packet using the updated copy of the forwarding information stored in the FIB cache.

In some implementations, the first network device may further generate a packet associated with another control plane session between the first network device and the second network device, determine another control plane session type (e.g., different from the control plane session type) associated with the other control plane session, determine whether the other control plane session type is associated with the FIB cache, and process, based on determining that the other control plane session type is not associated with the FIB cache, the packet using forwarding information, associated with the other control plane session, stored in the FIB.

In some implementations, the control plane session type associated with the control plane session may be a BGP session type or a BFD protocol control plane session type.

In some implementations, when determining whether the control plane session type is associated with the FIB cache, the first network device may determine whether the control plane session type is associated with the FIB cache based on one or more FIB caching rules associated with the control plane session type.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a network device 210 that is capable of protecting control plane traffic from a network event by processing various types of control plane traffic using a FIB cache that is associated with a FIB of network device 210. The FIB cache may have a lookup queue that is separate from a lookup queue of the FIB, which prevents delays in FIB lookup times from impacting lookup times of the FIB cache.

In some implementations, network device 210 may determine a control plane session type associated with a control plane session that is associated with the network device 210, and may determine whether the control plane session type is associated with the FIB cache on network device 210. In some implementations, network device 210 may obtain, based on determining that the control plane session type is associated with the FIB cache, forwarding information associated with the control plane session and store the forwarding information in the FIB cache. In some implementations, network device 210 may process the control plane session using the forwarding information stored in the FIB cache.

In this way, if the network event occurs, network device 210 may be able to process the control plane traffic in a way that prevents the control plane traffic from being delayed and/or dropped altogether. This conserves memory, processing, and networking resources that would have otherwise been consumed on repairing additional network events and/or negative effects that would have occurred if the control plane traffic were to be delayed and/or dropped. Moreover, this maintains network uptime and availability, as well as improves network reliability.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A conjunction used with regard to two or more alternatives (e.g., "or" or "and/or") is intended to be interpreted as inclusive (e.g., "and/or") rather than exclusive with regard to the two or more alternatives, irrespective of which form of the conjunction is predominately used herein, unless language to override this interpretation is used (e.g., "only one of," etc.).

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   one or more memories; and
   one or more processors to:
   determine a control plane session type associated with a control plane session,
      wherein the control plane session is associated with the network device;
   determine whether the control plane session type is associated with a forwarding information base (FIB) cache on the network device;
   obtain, based on determining that the control plane session type is associated with the FIB cache, forwarding information associated with the control plane session,
      wherein the forwarding information is stored in a FIB, associated with the FIB cache, on the network device;
   store the forwarding information in the FIB cache;
   process the control plane session using the forwarding information stored in the FIB cache;
   determine another control plane session type associated with another control plane session between the network device and another network device,
      wherein the other control plane session type is different from the control plane type;

determine whether the other control plane session type is associated with the FIB cache; and
process, based on determining that the other control plane session type is not associated with the FIB cache, a packet using forwarding information, associated with the other control plane session, stored in the FIB.

2. The network device of claim 1, wherein the one or more processors, when determining whether the control plane session type is associated with the FIB cache, are to:
determine whether the control plane session type is associated with the FIB cache based on one or more FIB caching rules associated with the control plane session type.

3. The network device of claim 1, wherein the control plane session is an internal control plane session between a control plane and a data plane of the network device,
wherein the one or more processors, when determining the control plane session type associated with the control plane session, are to:
determine that the control plane session type is an internal control plane session type.

4. The network device of claim 3, wherein the one or more processors, when determining whether the control plane session type is associated with the FIB cache, are to:
determine that the control plane session type is associated with the FIB cache based on a FIB caching rule specifying that the internal control plane session type is to be processed using the FIB cache.

5. The network device of claim 1, wherein the one or more processors, when determining whether the control plane session type is associated with the FIB cache, are to:
determine that the control plane session type is associated with the FIB cache based on the control plane session type being at least one of:
an internal Ethernet interface control plane session type,
a border gate protocol control plane session type,
a bidirectional forwarding detection control plane session type, or
a user datagram protocol control plane session type associated with a particular destination.

6. The network device of claim 1, wherein the one or more processors, when determining whether the control plane session type is associated with the FIB cache, are to:
determine that the control plane session type is not associated with the FIB cache based on the control plane session type being at least one of a simple network management protocol control plane session type or an Internet control message protocol control plane session type.

7. The network device of claim 1, wherein the forwarding information associated with the control plane session includes at least information identifying a destination associated with the control plane session.

8. The network device of claim 1, wherein a lookup queue of the FIB cache is separate from a lookup queue of the FIB.

9. The network device of claim 1, wherein the control plane session type is a bidirectional forwarding detection (BFD) protocol control plane session type, and wherein the one or more processors, when determining whether the control plane session type is associated with the FIB cache, are to:
determine that the BFD protocol control plane session type is associated with the FIB cache based on a FIB caching rule associating the BFD protocol control plane session type with the FIB cache.

10. A non-transitory computer-readable medium storing instructions, the instructions comprising:
one or more instructions that, when executed by one or more processors, cause the one or more processors to:
open a socket, on a network device, for a control plane session;
determine, based on opening the socket, a control plane session type associated with the control plane session;
determine whether the control plane session type is associated with a forwarding information base (FIB) cache on the network device;
obtain, based on determining that the control plane session type is associated with the FIB cache, a subset of forwarding information associated with the control plane session,
wherein the subset of forwarding information is stored in a FIB, associated with the FIB cache, on the network device;
store the subset of forwarding information in the FIB cache;
generate, after storing the subset of forwarding information in the FIB cache, a packet associated with the control plane session;
process the packet using the subset of forwarding information stored in the FIB cache;
terminate the control plane session after processing the packet,
wherein terminating the control plane session includes closing the socket; and
remove, based on terminating the control plane session, the subset of forwarding information associated with the control plane session from the FIB cache.

11. The non-transitory computer-readable medium of claim 10, wherein the one or more instructions, that cause the one or more processors to process the packet using the subset of forwarding information stored in the FIB cache, cause the one or more processors to:
identify, based on the subset of forwarding information stored in the FIB cache, a destination associated with the packet;
identify, based on the subset of forwarding information stored in the FIB cache, a next hop to the destination associated with the packet; and
transmit the packet to the next hop.

12. The non-transitory computer-readable medium of claim 10, wherein the one or more instructions, that cause the one or more processors to determine whether the control plane session type is associated with the FIB cache, cause the one or more processors to:
determine whether the control plane session type is associated with the FIB cache based on one or more FIB caching rules associated with the control plane session type.

13. The non-transitory computer-readable medium of claim 10, wherein the control plane session type is a bidirectional forwarding detection (BFD) protocol control plane session type, and
the one or more instructions, that cause the one or more processors to determine whether the control plane session type is associated with the FIB cache, cause the one or more processors to:
determine that the BFD protocol control plane session type is associated with the FIB cache based on a FIB caching rule associating the BFD protocol control plane session type with the FIB cache.

14. A method, comprising:
receiving, at a first network device, a request to establish a control plane session between the first network device and a second network device;
based on receiving the request:
opening, by the first network device, a socket on the first network device for the control plane session; and
determining, by the first network device, a control plane session type associated with the control plane session;
determining, by the first network device, whether the control plane session type is associated with a forwarding information base (FIB) cache on the first network device;
identifying, by the first network device and based on determining that the control plane session type is associated with the FIB cache, forwarding information associated with the control plane session,
wherein the forwarding information is stored in a FIB, on the first network device, associated with the FIB cache;
storing, by the first network device, a copy of the forwarding information in the FIB cache;
processing, by the first network device, the control plane session using the copy of the forwarding information stored in the FIB cache;
generating, by the first network device, a packet associated with another control plane session between the first network device and the second network device;
determining, by the first network device, another control plane session type associated with the other control plane session,
wherein the other control plane session type is different from the control plane session type;
determining, by the first network device, whether the other control plane session type is associated with the FIB cache; and
processing, by the first network device and based on determining that the other control plane session type is not associated with the FIB cache, the packet using forwarding information, associated with the other control plane session, stored in the FIB.

15. The method of claim 14, further comprising:
detecting a change to the forwarding information stored in the FIB; and
updating the copy of the forwarding information in the FIB cache, to form an updated copy of the forwarding information, based on the change to the forwarding information stored in the FIB.

16. The method of claim 15, wherein processing the control plane session using the copy of the forwarding information stored in the FIB cache comprises:
generating, after updating the copy of the forwarding information stored in the FIB cache, a packet associated with the control plane session; and
processing the packet using the updated copy of the forwarding information stored in the FIB cache.

17. The method of claim 16, further comprising:
terminating the control plane session after processing the packet,
wherein terminating the control plane session includes closing the socket; and
removing from the FIB cache, based on terminating the control plane session, a subset of forwarding information associated with the control plane session.

18. The method of claim 14, wherein the control plane session type associated with the control plane session is at least one of a border gateway protocol session type or a bidirectional forwarding detection protocol control plane session type.

19. The method of claim 14, wherein determining whether the control plane session type is associated with the FIB cache comprises:
determining whether the control plane session type is associated with the FIB cache based on one or more FIB caching rules associated with the control plane session type.

20. The method of claim 14, wherein the control plane session type is a bidirectional forwarding detection (BFD) protocol control plane session type, and wherein determining whether the control plane session type is associated with the FIB cache comprises determining that the BFD protocol control plane session type is associated with the FIB cache based on a FIB caching rule associating the BFD protocol control plane session type with the FIB cache.

* * * * *

UNITED STATES PATENT AND TRADEMARK OFFICE
CERTIFICATE OF CORRECTION

| | |
|---|---|
| PATENT NO. | : 10,742,553 B1 |
| APPLICATION NO. | : 15/991694 |
| DATED | : August 11, 2020 |
| INVENTOR(S) | : Reji Thomas et al. |

Page 1 of 1

It is certified that error appears in the above-identified patent and that said Letters Patent is hereby corrected as shown below:

In the Claims

In Claim 1, Column 22, Line 67, "the control plane type;" should be changed to --the control plane session type;--.

Signed and Sealed this
Twenty-seventh Day of October, 2020

Andrei Iancu
*Director of the United States Patent and Trademark Office*